(12) United States Patent
Poduval

(10) Patent No.: US 12,543,619 B2
(45) Date of Patent: Feb. 10, 2026

(54) METHODS AND APPARATUS TO SELECT OPERATIONAL WIDTHS OF IMPLEMENTS FOR AN AGRICULTURAL VEHICLE

(71) Applicant: Deere & Company, Moline, IL (US)

(72) Inventor: Manu Mohan Poduval, Pune (IN)

(73) Assignee: Deere & Company, Moline, IL (US)

( * ) Notice: Subject to any disclaimer, the term of this patent is extended or adjusted under 35 U.S.C. 154(b) by 92 days.

(21) Appl. No.: 18/436,683

(22) Filed: Feb. 8, 2024

(65) Prior Publication Data
US 2025/0255206 A1    Aug. 14, 2025

(51) Int. Cl.
*A01B 69/00* (2006.01)
*A01B 79/00* (2006.01)

(52) U.S. Cl.
CPC .......... *A01B 69/004* (2013.01); *A01B 79/005* (2013.01)

(58) Field of Classification Search
CPC .............................. A01B 69/004; A01B 79/005
See application file for complete search history.

(56) References Cited

PUBLICATIONS

Hoffman, Optimal Coverage Path Planning for Agricultural Vehicles with Curvature Constraints, https://www.mdpi.com/2077-0472/13/11/2112 (Year: 2023).*
Mukhamediev, Coverage Path Planning Optimization of Heterogeneous UAVs Group for Precision Agriculture, https://ieeexplore.ieee.org/stamp/stamp.jsp?arnumber=10011226 (Year: 2022).*
Eiamsa-Ard et al., "Sensor Based Path Planning: Three-Dimensional Exploration and Coverage," 1999 Mechanical Engineering Graduate Technical Conference, Pittsburgh, Apr. 16, 1999, 11 pages.

* cited by examiner

*Primary Examiner* — Aryan E Weisenfeld
(74) *Attorney, Agent, or Firm* — Hanley, Flight & Zimmerman, LLC

(57) ABSTRACT

Methods and apparatus to select operational widths of implements for an agricultural vehicle are disclosed. An example apparatus includes at least one processor circuit to identify a first implement and a second implement available for a second operation on a field, the second operation to be performed after a first operation on the field, generate a first guidance line and a second guidance line for the second operation, calculate a first crop damage metric corresponding to the first guidance line and a second crop damage metric corresponding to the second guidance line, and select one of the first implement or the second implement based on the first crop damage metric and the second crop damage metric.

17 Claims, 9 Drawing Sheets

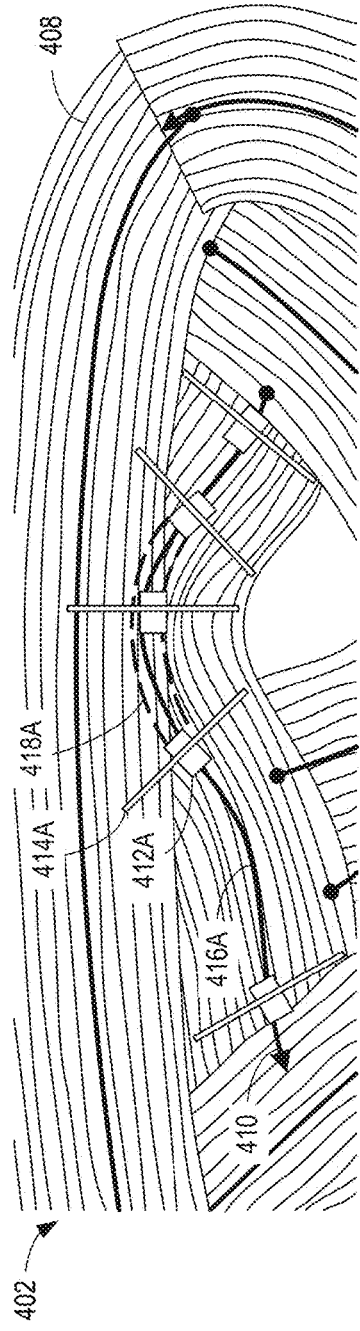
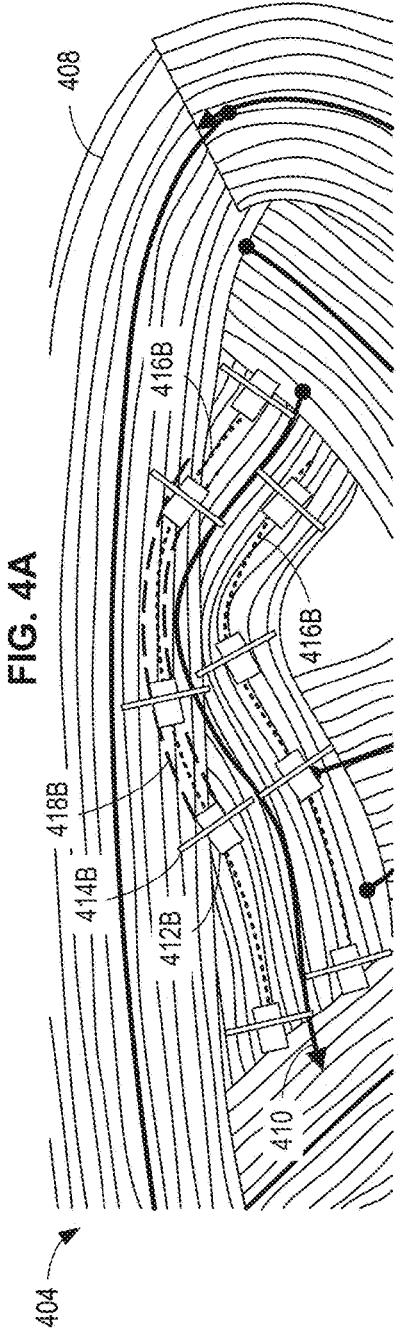
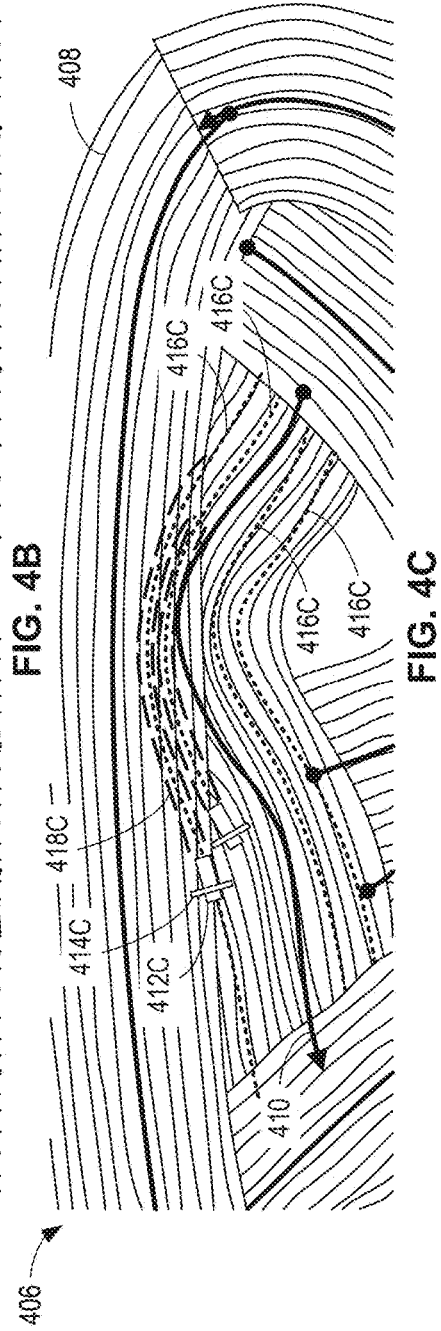

METHODS AND APPARATUS TO SELECT OPERATIONAL WIDTHS OF IMPLEMENTS FOR AN AGRICULTURAL VEHICLE

FIELD OF THE DISCLOSURE

This disclosure relates generally to agricultural vehicles and, more particularly, to methods and apparatus to select operational widths of implements for an agricultural vehicle.

BACKGROUND

Agricultural vehicles have become increasingly automated. Agricultural vehicles may semi-autonomously or fully-autonomously drive and perform operations on fields using implements for planting, spraying, harvesting, fertilizing, stripping/tilling, etc. These autonomous agricultural vehicles include multiple sensors (e.g., Global Navigation Satellite Systems (GNSS), Global Positioning Systems (GPS), Light Detection and Ranging (LIDAR), Radio Detection and Ranging (RADAR), Sound Navigation and Ranging (SONAR), telematics sensors, Computer Vision (CV) with mono-cameras and/or stereo-cameras, etc.) to help navigate without assistance, or with limited assistance, from human users.

SUMMARY

An example apparatus described herein includes at least one processor circuit to identify a first implement and a second implement available for a second operation on a field, the second operation to be performed after a first operation on the field, the first implement having a first operational width, the second implement having a second operational width different from the first operational width. The at least one processor circuit is to generate a first guidance line and a second guidance line for the second operation, the first guidance line based on the first operational width and location data from a vehicle during the first operation, the second guidance line based on the second operational width and the location data. The at least one processor circuit is to calculate a first crop damage metric corresponding to the first guidance line and a second crop damage metric corresponding to the second guidance line. The at least one processor circuit is to select one of the first implement or the second implement based on the first crop damage metric and the second crop damage metric.

At least one example non-transitory machine-readable medium described herein includes machine-readable instructions to cause at least one processor circuit to identify a first implement and a second implement available for a second operation on a field, the second operation to be performed after a first operation on the field, the first implement having a first operational width, the second implement having a second operational width different from the first operational width. The machine-readable instructions are to cause at least one processor circuit to generate a first guidance line and a second guidance line for the second operation, the first guidance line based on the first operational width and location data from a vehicle during the first operation, the second guidance line based on the second operational width and the location data. The machine-readable instructions are to cause at least one processor circuit to calculate a first crop damage metric corresponding to the first guidance line and a second crop damage metric corresponding to the second guidance line. The machine-readable instructions are to cause at least one processor circuit to select one of the first implement or the second implement based on the first crop damage metric and the second crop damage metric.

An example method described herein includes identifying a first implement and a second implement available for a second operation on a field, the second operation to be performed after a first operation on the field, the first implement having a first operational width, the second implement having a second operational width different from the first operational width. The method further includes generating a first guidance line and a second guidance line for the second operation, the first guidance line based on the first operational width and location data from a vehicle during the first operation, the second guidance line based on the second operational width and the location data. The method further includes calculating, by at least one processor circuit programmed by at least one instruction, a first crop damage metric corresponding to the first guidance line and a second crop damage metric corresponding to the second guidance line. The method further includes selecting, by one or more of the at least one processor circuit, one of the first implement or the second implement based on the first crop damage metric and the second crop damage metric.

BRIEF DESCRIPTION OF THE DRAWINGS

FIG. 4A illustrates a first example map that may be generated and/or output for presentation by the example implement selection circuitry of FIGS. 1 and/or 2.

FIG. 4B illustrates a second example map that may be generated and/or output for presentation by the example implement selection circuitry of FIGS. 1 and/or 2.

FIG. 4C illustrates a third example map that may be generated and/or output for presentation by the example implement selection circuitry of FIGS. 1 and/or 2.

Figure 1:
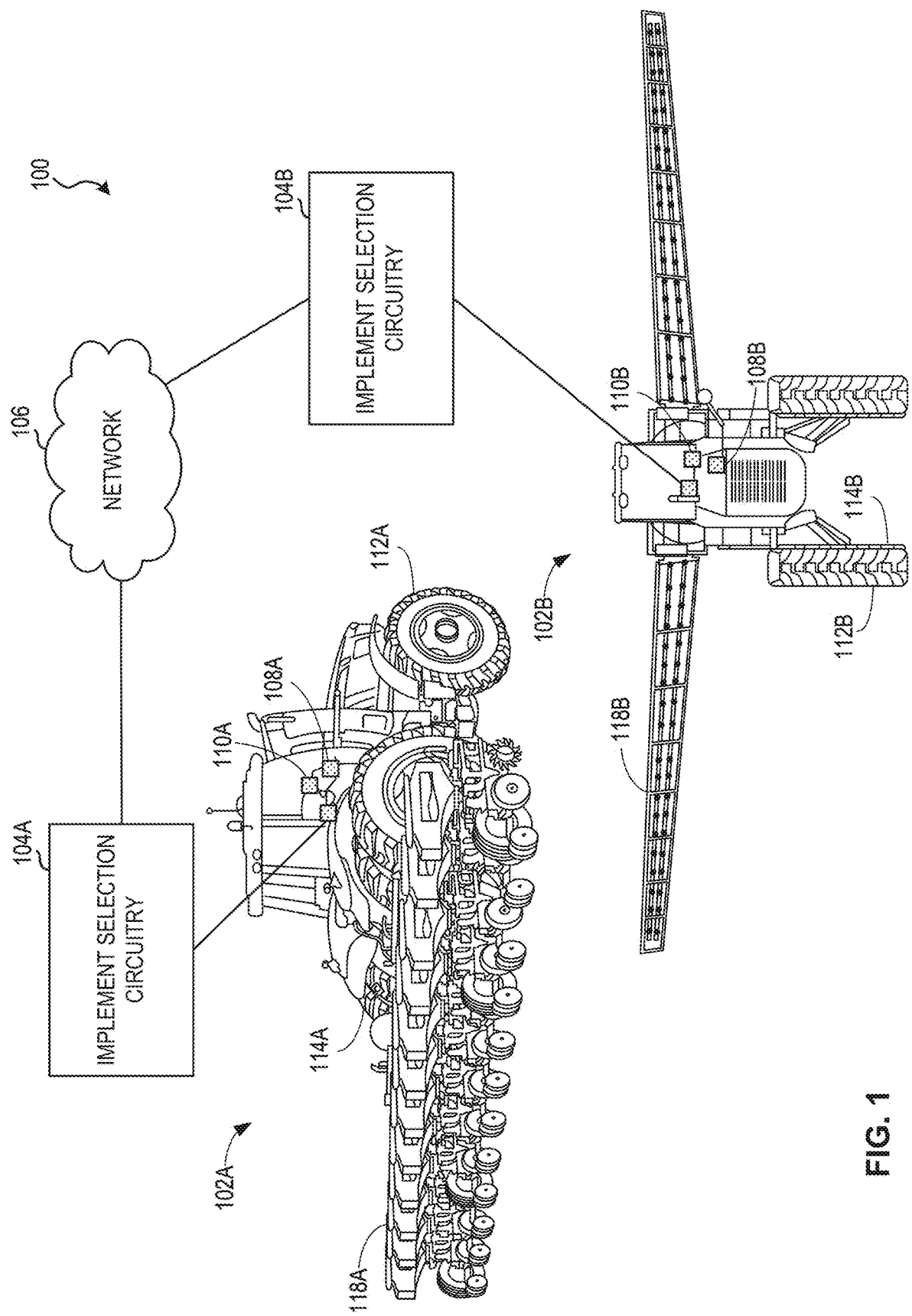
FIG. 1 is a schematic illustration of first and second example vehicles utilizing example implement selection circuitry in accordance with teachings of this disclosure.

(e.g., for inclusion in products to be distributed to, for example, retailers and/or to other end users such as direct buy customers).

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Automation of agricultural vehicles is commercially desirable because automation can improve the accuracy with which operations are performed, reduce operator fatigue, improve efficiency, and accrue other benefits. Some automated vehicles include and/or are otherwise enabled for automation functionality, but the user may need to engage and/or disengage the automation functionality. For example, a user could switch a vehicle into an autonomous mode of operation, but the vehicle would not autonomously drive until the user presses a button or toggles a switch to "engage" automation. As such, the vehicle can be referred to as being in a "standby" autonomous mode of operation when automation is enabled but not engaged, and in a "fully" autonomous mode of operation when automation is enabled and engaged. In either standby autonomous mode or fully autonomous mode, a user may be present within the vehicle.

Whether in standby autonomous mode or fully autonomous mode, autonomous vehicles include one or more controllers to ensure that the autonomous vehicles traverse terrain properly. In examples described herein, automated vehicles follow guidance paths when in fully autonomous mode. A controller may have many different modes of operation including an acquisition mode of operation and a tracking mode of operation. As used herein, "tracking," "tracking mode," "tracking mode of operation," and/or their derivatives refer to following and/or tracking a guidance path (e.g., in a fully autonomous mode). As used herein, "acquisition," "acquisition mode," "acquisition mode of operation," and/or their derivatives refer to operation when the vehicle is travelling to a guidance path, a path, and/or acquiring a position that is substantially similar to (e.g., within one meter of, within a half meter of, within two meters of, etc.) a guidance path. The path a vehicle takes or may take during acquisition mode is referred to herein as "an acquisition path," and "an acquisition line," among others.

Guidance paths (e.g., target paths) are used by a navigation and/or location apparatus (e.g., a Global Positioning System (GPS) receiver) and a controller in tracking mode to steer a vehicle. In some examples, the guidance path includes turns, curves, etc., for the vehicle to follow when operating in a field. Conventional controllers, sometimes referred to as guidance systems, allow users of a vehicle to specify a guidance path for the vehicle in the cab. Alternatively, some guidance systems can automatically select and/or generate the guidance path for the vehicle.

In some instances, an implement can be coupled to a vehicle to perform one or more operations (e.g., planting, spraying, harvesting, fertilizing, stripping/tilling, etc.) on a field. For instance, a first implement can be used to perform first operation (e.g., planting), and a second implement can be used to perform a second operation (e.g., spraying) after the first operation. In some cases, the first implement and the second implement can be interchangeably coupled to a vehicle. For instance, the first implement can be coupled to the vehicle to enable the vehicle to perform the first operation, then the first implement can be removed, and the second implement can be coupled to the vehicle to enable the vehicle to perform the second operation. Alternatively, in some instances, the first implement and the second implement can be coupled to respective different vehicles. For instance, the first implement can be coupled to a first vehicle to enable the first vehicle to perform the first operation, and the second implement can be coupled to a second vehicle to enable the second vehicle to perform the second operation.

Different implements often have different operational widths, and differences between the operational widths of implements may complicate determination of guidance paths for the vehicle. For instance, if a twelve-row planter is utilized to plant crops following a set of guidance lines, following those same guidance lines when subsequently using a sixteen-row cultivator/side-dress rig for a fertilization operation may result in crop rows that are not fertilized. Accordingly, some guidance systems generate different guidance lines and/or adjust the guidance lines for a vehicle based on the operational width of implement(s) to be coupled to the vehicle. In some cases, as a result of the vehicle following different guidance paths during prior operations on the same field, one or more tires of the vehicle may run over and/or damage crop rows in the field. Such crop damage can reduce crop yield and/or reduce profit associated with the crop in the field.

Examples described herein may reduce crop damage by selecting between different operational widths of implements based on expected crop damage metrics associated with corresponding ones of the implements. For example, implement selection circuitry described herein identifies crop row locations in a field based on example location data from a first, prior, example operation (e.g., planting, tilling, etc.), where the first operation is performed by a vehicle following a set of guidance lines on the field. In some examples, the implement selection circuitry identifies one or more candidate implements that may be used to perform a second example operation (e.g., spraying, harvesting, etc.) on the field, where the second operation is to be performed after the first operation. In some examples, the candidate implements correspond to respective different operational widths In some examples, the implement selection circuitry generates example candidate guidance lines for corresponding ones of the candidate implements based on the associated operational widths of the implements and the crop row locations. Further, the implement selection circuitry calculates and/or estimates example crop damage metrics for respective ones of the candidate guidance lines and/or the corresponding candidate implements. In some examples, the crop damage metric(s) for a candidate implement include an amount (e.g., an area, a proportion, etc.) of crop that is expected to be damaged as a result of a vehicle traversing the candidate guideline line with the corresponding implement.

In some examples, the implement selection circuitry selects, based on the crop damage metrics, one(s) of the candidate implements to perform the second operation on the field. For example, the implement selection circuitry can select the one(s) of the candidate implements that is expected to result in less crop damage compared to remaining one(s) of the available implements. In some examples, the implement selection circuitry selects the one(s) of the candidate implements based on a tradeoff between the expected crop damage and one or more example parameters associated with the corresponding candidate guidance line(s) (e.g., a length of the guidance line(s), a number of turns in the guidance line(s), a speed and/or duration to traverse the guidance line(s), etc.). In some examples, the implement selection circuitry indicates, via an example user interface, the selected implement(s) to an operator. Additionally or alternatively, the implement selection circuitry can cause the user interface to present the crop damage metric(s) for multiple ones of the candidate implements, and an operator can manually select one(s) of the implements for use in performing the second operation. Advantageously, by enabling an operator to select and/or utilize implements that reduce crop damage, examples described herein can improve efficiency of one or more operations performed on a field. In particular, examples described herein can improve yield and/or profit associated with the operation(s).

FIG. 1 is a schematic illustration of an example environment 100 including first and second example vehicles 102A, 102B utilizing example implement selection circuitry 104 in accordance with teachings of this disclosure. For example, the first vehicle 102A utilizes first example implement selection circuitry 104A, and the second vehicle 102B utilizes second implement selection circuitry 104B. In this example, the implement selection circuitry 104A, 104B is implemented locally at the respective vehicles 102A, 102B, and is communicatively coupled to an example network 106. In some examples, the implement selection circuitry 104A, 104B can be implemented in a cloud-based environment and communicatively coupled to the respective vehicles 102A, 102B via the network 106. In some such examples, one of the first implement selection circuitry 104A or the second implement selection circuitry 104B can be omitted, and a remaining one of the first implement selection circuitry 104A or the second implement selection circuitry 104B can used for one or both of the vehicles 102A, 102B.

In the illustrated example of FIG. 1, the first vehicle 102A includes an example Global Positioning System (GPS) receiver 108A, an example user interface 110A, front wheels (one of which is shown at reference numeral 112A), and rear wheels (one of which is shown at reference numeral 114A). The second vehicle 102B includes an example Global Positioning System (GPS) sensor 108B, an example user interface 110B, front wheels (one of which is shown at reference numeral 112B), and rear wheels (one of which is shown at reference numeral 114B).

As illustrated and described herein, the structure and/or function of any one of the implement selection circuitry 104B, the GPS sensor 108B, the user interface 110B, the front wheels (e.g., the front wheel 112B), and/or the rear wheels (e.g., the rear wheel 114B) of the second vehicle 102B may be the same as the corresponding component on the first vehicle 102A. Therefore, for example, description and/or illustration associated with the first implement selection circuitry 104A of the first vehicle 102A can be considered to apply equally to the second implement selection circuitry 104B of the second vehicle 102B.

As used herein, when referring to "the vehicle 102," it is to be understood that the description and/or illustration applies to both the first vehicle 102A and the second vehicle 102B. Similarly, when referring to any one or more of the components of the first vehicle 102A or the second vehicle 102B, if a component is discussed (e.g., the implement selection circuitry 104, the GPS sensor 108, the user interface 110, the front wheel 112, the rear wheel 114, etc.), it is to be understood that the illustration and/or description applies to these respective parts on both of the first vehicle 102A and the second vehicle 102B.

In the example illustrated in FIG. 1, the first vehicle 102A is a planter and the second vehicle 102B is a sprayer. However, the first vehicle 102A and/or the second vehicle 102B may be any type of vehicle (e.g., a tractor, front loader, harvester, cultivator, or any other suitable vehicle) configured to perform an operation on a field. In this example, a first example implement 118A is coupled (e.g., removably coupled) to the first vehicle 102A to enable the first vehicle 102A to perform a first example operation (e.g., a planting operation) on a field. Further, a second example implement 118B is coupled (e.g., removably coupled) to the second vehicle 102B to enable the second vehicle 102B to perform a second example operation (e.g., a spraying operation) on the field. In some examples, the second vehicle 102B performs the second operation after the first vehicle 102A performs the first operation. In some examples, one of the first vehicle 102A or the second vehicle 102B can be used to perform both the first and second operations. For example, the first implement 118A can be removed from the first vehicle 102A after the first vehicle 102A performs the first operation, and the second implement 118B can be coupled to the first vehicle 102A to enable the first vehicle 102A to perform the second operation.

In some examples, different implements can be coupled to the vehicle 102 (e.g., the first vehicle 102A and/or the second vehicle 102B) to enable the vehicle 102 to perform the first operation and/or the second operation. For example, the first implement 118A and/or the second implement 118B may be selected from a set of candidate implements (e.g., available implements), where different ones of the candidate implements can correspond to different operations and/or different operational widths (e.g., implement widths, implement attributes, etc.). In some examples, the implement(s) 118A, 118B can be manually selected (e.g., by an operator) from the set of candidate implements. However, the use of different ones of the candidate implements may result in different amounts of crop damage during operation, and it may be difficult and/or impractical for an operator to accurately predict the amount of crop damage expected for the different implements. As a result, manual selection of the implement(s) may result in inefficiencies such as reduced profit and/or reduced yield associated with one or more operations.

In the illustrated example of FIG. 1, the implement selection circuitry 104 is implemented by one(s) of the example vehicles 102A, 102B to facilitate selection of implement(s) for use in one or more operations in a field. For example, the implement selection circuitry 104 of FIG. 1 can determine example crop damage metrics for respective ones of the implements, where the crop damage metrics can include at least one of one an area of the crop damage and/or a proportion (e.g., a percentage) of the crop damage area relative to an area of the field. In some examples, the implement selection circuitry 104 generates, based on operational width(s) of the implement(s), example candidate guidance lines that may be traversed by the vehicle 102 to perform the operation(s) using the corresponding implement(s). In some examples, based on the candidate guidance lines and locations of crop rows in the field, the implement selection circuitry 104 identifies regions of crop damage that are expected to result from the vehicle 102 traversing the respective candidate guidance lines. In such examples, the implement selection circuitry 104 can select one(s) of the candidate implements that is expected to result in reduced crop damage compared to remaining one(s) of the candidate implements, and indicates the selected implement(s) to an operator via, for example, the user interface 110 of the vehicle 102. In some examples, the implement selection circuitry 104 can cause the vehicle 102 to automatically traverse the candidate guidance line corresponding to the selected implement(s).

Figure 2:
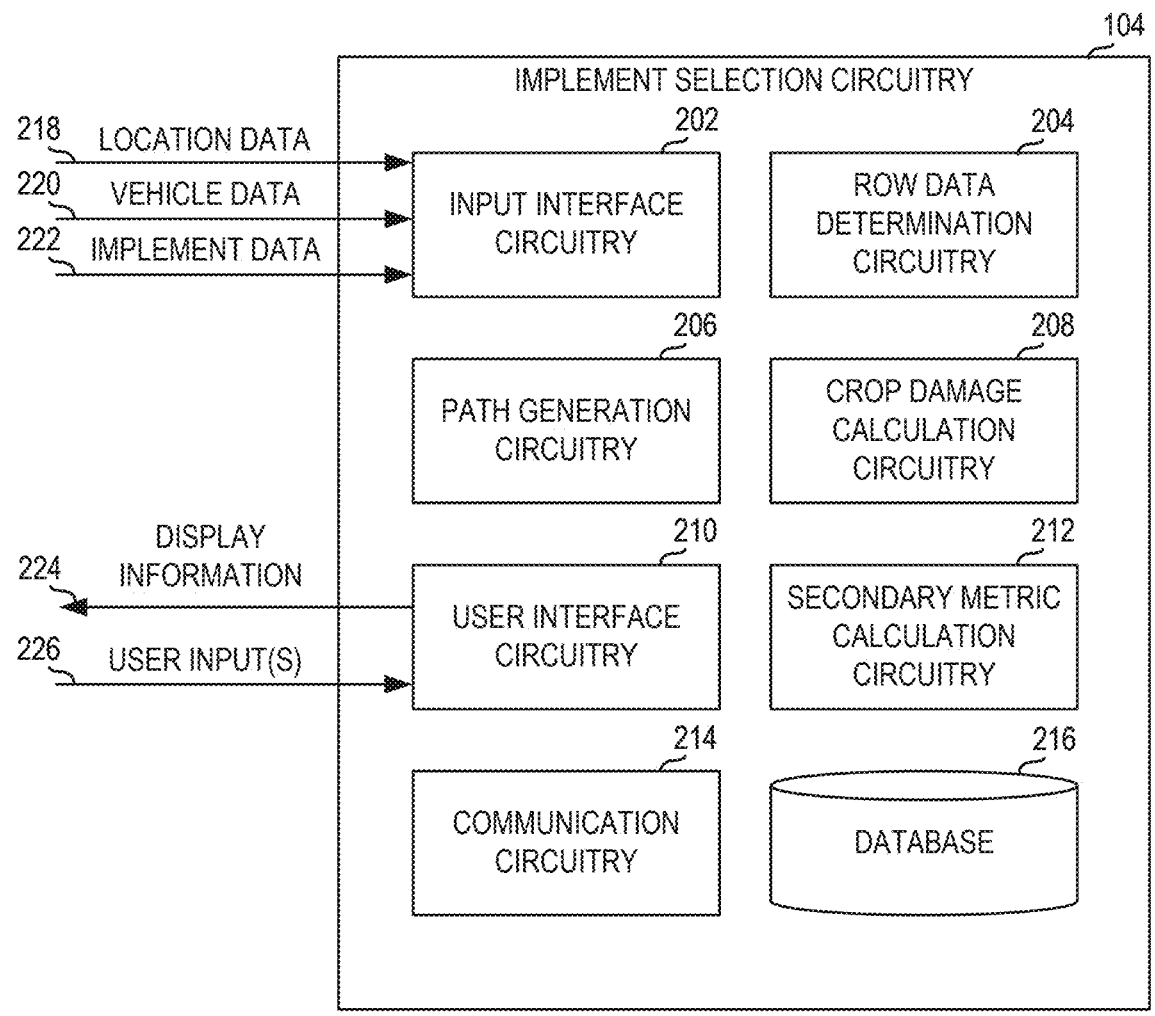
FIG. 2 is a block diagram of an example implementation of the implement selection circuitry of FIG. 1.

FIG. 2 is a block diagram of an example implementation of the implement selection circuitry 104 of FIG. 1. The implement selection circuitry 104 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the implement selection circuitry 104 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. Some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

In the illustrated example of FIG. 2, the implement selection circuitry 104 includes input interface circuitry 202, row data determination circuitry 204, path generation circuitry 206, crop damage calculation circuitry 208, user interface circuitry 210, secondary metric calculation circuitry 212, communication circuitry 214, and an database 216.

The input interface circuitry 202 of the example of FIG. 2 accesses and/or obtains example input data to be utilized by the implement selection circuitry 104. For example, the input interface circuitry 202 accesses and/or obtains, from the GPS sensor 108 of FIG. 1, location data (e.g., GPS data) 218 associated with the vehicle 102 (e.g., the first vehicle 102A and/or the second vehicle 102B) of FIG. 1. In some examples, the location data 218 represents geographic locations of the vehicle 102 at different points in time. In some examples, the input interface circuitry 202 accesses and/or obtains the location data 218 while the vehicle 102 performs a first operation on a field. In some such examples, the input interface circuitry 202 can obtain the location data 218 periodically during the first operation (e.g., at preset intervals and/or responsive to request(s) to the GPS sensor 108). In some examples, the input interface circuitry 202 provides the location data 218 to the example database 216 for storage therein.

In some examples, the input interface circuitry 202 accesses and/or obtains vehicle data 220 associated with the vehicle 102. For example, the input interface circuitry 202 can obtain the vehicle data 220 based on user input (e.g., example user input(s) 226) to the user interface 110 of FIG. 1, and/or can access the vehicle data 220 from a cloud-based and/or remote storage environment (e.g., communicated coupled to the implement selection circuitry 104 via the example network 106 of FIG. 1). In some examples, the vehicle data 220 can be preloaded in the database 216, and the input interface circuitry 202 accesses the vehicle data 220 from the database 216. In some examples, the vehicle data 220 includes dimensions associated with the vehicle 102, such as a wheelbase of the vehicle 102, locations (e.g., grid locations, X-, Y-, and/or Z-coordinates, etc.) of different parts of the vehicle 102 relative to a reference point (e.g., a geometric center) of the vehicle 102, distances between ones of the example wheels 112, 114 of the vehicle 102, widths (e.g., tire widths) of corresponding one(s) of the wheels 112, 114, etc. In some examples, the input interface circuitry 202 provides the vehicle data 220 to the database 216 for storage therein.

In the illustrated example of FIG. 2, the input interface circuitry 202 accesses and/or obtains implement data 222 associated with one or more candidate implements (e.g., available implements) that may be utilized by the vehicle 102 to perform one or more second operations (e.g., spraying, harvesting, etc.) on the field. In some examples, the implement data 222 can include identifiers associated with respective ones of the candidate implements, operational widths of the respective candidate implements, and/or one or more example operations that may be performed using the respective candidate implements. In some examples, the implement data 222 further includes information associated with a first implement (e.g., the first implement 118A of FIG. 1) that was utilized by the vehicle 102 to perform the first operation on the field, such as a first operational width associated with a first implement. In some examples, the input interface circuitry 202 obtains the implement data 222 based on user input (e.g., the user input(s) 226) to the user interface 110 of FIG. 1, and/or can access the implement data 222 from a cloud-based and/or remote storage environment (e.g., communicated coupled to the implement selection circuitry 104 via the network 106 of FIG. 1). In some examples, the implement data 222 is preloaded in the database 216, and the input interface circuitry 202 can access the implement data 222 from the database 216. In some examples, the input interface circuitry 202 is instantiated by programmable circuitry executing input interface circuitry instructions and/or configured to perform operations such as those represented by the flowchart(s) of FIG. 5.

The database 216 of FIG. 2 stores data utilized and/or obtained by the implement selection circuitry 104. For example, the database 216 can store the location data 218, the vehicle data 220, and/or the implement data 222 accessed and/or obtained by the input interface circuitry 202. The example database 216 of FIG. 2 is implemented by any memory, storage device and/or storage disc for storing data such as, for example, flash memory, magnetic media, optical media, solid state memory, hard drive(s), thumb drive(s), etc. Furthermore, the data stored in the database 216 may be in any data format such as, for example, binary data, comma delimited data, tab delimited data, structured query language (SQL) structures, etc. While, in the illustrated example, the database 216 is illustrated as a single device, the example database 216 and/or any other data storage devices described herein may be implemented by any number and/or types of memories and/or software.

The row data determination circuitry 204 of FIG. 2 determines and/or obtains row data (e.g., crop row locations) associated with crops planted in a field. In some examples, the row data determination circuitry 204 determines the row data based on the implement data 222 and/or the location data 218 associated the first operation (e.g., a planting operation). For example, based on the first operational width of the first implement utilized by the vehicle 102 during the first operation (e.g., represented in the implement data 222) and/or based on the first guidance line traversed by the vehicle 102 during the first operation (e.g., represented in the location data 218), the row data determination circuitry 204 determines the crop row locations of crop rows planted in the field. In some examples, the row data determination circuitry 204 provides the crop row locations to the database 216 for storage therein. In some examples, the row data determination circuitry 204 is instantiated by programmable circuitry executing row data determination circuitry instructions and/or configured to perform operations such as those represented by the flowchart(s) of FIG. 5.

The path generation circuitry 206 generates and/or determines one or more example candidate guidance lines for the vehicle 102 to perform the second operation (e.g., a spraying operation, a harvesting operation, etc.) on the field. For example, the path generation circuitry 206 generates the candidate guidance line(s) for respective one(s) of the candidate implements (e.g., represented in the implement data 222) that may be used to perform the second operation. In some examples, the path generation circuitry 206 identifies the second operation to be performed based on the user input(s) 226 to the user interface 110. Further, the path generation circuitry 206 identifies and/or selects, from the candidate implements represented in the implement data 222, one(s) of the candidate implements that can be used to perform the second operation. In some such examples, the path generation circuitry 206 identifies, based on the implement data 222, operational width(s) associated with the selected one(s) of the candidate implements.

In some examples, based on the crop row locations and/or the operational width(s) of the selected one(s) of the candidate implements, the path generation circuitry 206 generates respective candidate guidance line(s) for the one(s) of the candidate implements. For example, the path generation circuitry 206 generates the candidate guidance line(s) along which the vehicle 102 can traverse to perform the second operation on the field using the respective candidate implement(s). In some examples, the path generation circuitry 206 generates the candidate guidance line(s) by executing one or more example path planning algorithms based on the crop row locations and/or based on the operational width(s) of the selected candidate implement(s). In some examples, the path generation circuitry 206 generates multiple candidate guidance lines for a corresponding one of the selected candidate implement(s), and selects one of the multiple candidate guidance lines that satisfies one or more example thresholds and/or characteristics. In one example, the path generation circuitry 206 selects the one of the multiple candidate guidance lines that enables the vehicle 102 to operate on at least a threshold proportion (e.g., 80%, 90%, 95%, etc.) of the crop rows using the selected candidate implement. In some examples, the path generation circuitry 206 selects the one of the multiple candidate guidance lines having a shortest length, a least number of turns, etc. (e.g., compared to remaining ones of the multiple candidate guidance lines). In some examples, after generating and/or selecting the candidate guidance line(s) for the selected candidate implement(s), the path generation circuitry 206 provides the candidate guidance line(s) to the database 216 for storage therein. In some examples, the path generation circuitry 206 is instantiated by programmable circuitry executing path generation circuitry instructions and/or configured to perform operations such as those represented by the flowchart(s) of FIG. 5.

The example crop damage calculation circuitry 208 generates and/or determines example crop damage metric(s) associated with respective candidate implement(s) and/or the candidate guidance line(s). For example, the crop damage calculation circuitry 208 accesses the crop row locations determined by the row data determination circuitry 204, and accesses the candidate guidance line(s) generated by the path generation circuitry 206. In some examples, the crop damage calculation circuitry 208 determines the crop damage metric(s) associated with respective one(s) of the candidate guidance lines by determining an amount (e.g., an area, a percentage) of overlap between the crop row locations and example tire track locations of the vehicle 102 when traversing the respective candidate guidance line(s).

In the illustrated example of FIG. 2, the crop damage calculation circuitry 208 predicts and/or estimates, based on the vehicle data 220, the tire track locations of the vehicle 102 associated with the respective candidate guidance line(s). For example, the crop damage calculation circuitry 208 accesses, from the vehicle data 220, one or more example distances between the wheels 112, 114 of the vehicle 102 (e.g., a first example distance between the front wheels 112 of the vehicle 102 and/or a second example distance between the rear wheels 144 of the vehicle 102). Further, the crop damage calculation circuitry 208 accesses, from the vehicle data 220, example tire width(s) associated with respective one(s) of the wheels 112, 114. In some examples, based on the distances between the respective wheels 112, 144 and/or based on the tire width(s), the crop damage calculation circuitry 208 determines example inner tire track boundaries and/or example outer tire track boundaries for respective ones of the wheels 112, 114 along one(s) of the candidate guidance line(s). In some such examples, the crop damage calculation circuitry 208 can determine the tire track locations based on the inner and outer tire track boundaries.

For example, the inner tire track boundary for a corresponding one of the wheels 112, 114 represents a path corresponding to an example inside edge of a tire of the one of the wheels 112, 114, and the outer tire track boundary for the one of the wheels 112, 114 represents a path corresponding to an example outside edge of the tire. In some examples, the inside edge is along an inner surface of the tire and the outside edge is along an outer surface of the tire, where the inner surface faces inward (e.g., toward a center of the vehicle 102) and the outer surface faces away from the vehicle 102. In some examples, the inner tire track boundaries and/or the outer tire track boundaries for a corresponding candidate guidance line can be similar (e.g., in shape) to the candidate guidance line, but can be offset from the candidate guidance line. In some examples, the crop damage calculation circuitry 208 determines example offset value(s) for the inner and outer tire track boundaries based on the distance(s) between the front wheels 112 and/or the rear wheels 114 and/or based on the tire width(s) of the front wheels 112 and/or the rear wheels 114. For example, the crop damage calculation circuitry 208 can determine that a first inner tire track boundary for a first one of the front wheels 112 (e.g., a left front wheel) is offset from the candidate guidance line by a first example offset distance, where the first offset distance corresponds to a portion (e.g., half) of the first distance between the front wheels 112 of the vehicle 102. Further, the crop damage calculation circuitry 208 can determine that a first outer tire track boundary for the first one of the front wheels 112 is offset from the candidate guidance line by a second example offset distance, where the second offset distance corresponds to a sum of the first offset distance and a tire width of the first one of the front wheels 112. Determination of the inner and outer tire track boundaries is described further in connection with FIG. 3 below.

In some examples, for a given candidate guidance line, the crop damage calculation circuitry 208 determines and/or estimates the inner and outer tire track boundaries for respective one(s) of the wheels 112, 114. In such examples, the crop damage calculation circuitry 208 provides the inner and outer tire track boundaries to the database 216 to be stored in association with the corresponding candidate guidance line. In some examples, the crop damage calculation circuitry 208 determines example tire track locations (e.g., a tire track coverage area) based on the inner and outer tire track boundaries. For example, the tire track locations correspond to area(s) of the field that are run over by the wheels 112, 114 of the vehicle 102 when the vehicle 102 traverses the candidate guidance line. In some examples, the crop damage calculation circuitry 208 determines the tire track locations for corresponding one(s) of the wheels 112, 114 by determining the area(s) between respective ones of the inner and outer tire track boundaries of the corresponding wheel(s) 112, 114.

In some examples, the crop damage calculation circuitry 208 calculates one or more example crop damage metrics for the candidate guidance line based on the tire track locations. For example, the crop damage metric(s) can include an area (e.g., a total area) of crop damage expected to occur as a result of the vehicle 102 traversing the candidate guidance line. Additionally or alternatively, the crop damage metric(s) can include a proportion (e.g., a percentage) of the crop rows expected to be damaged as a result of the vehicle 102 traversing the candidate guidance line. In some examples, to determine the crop damage metric(s), the crop damage calculation circuitry 208 compares the tire track locations with the crop row locations in the field, and identifies overlapping region(s) between the tire track locations and the crop row locations. In such examples, the overlapping region(s) correspond to region(s) of the crop rows that are expected to be run over and/or otherwise damaged when the vehicle 102 traverses the candidate guidance line. In some examples, the crop damage calculation circuitry 208 determines the crop damage metric(s) by determining an area (e.g., a total area) of the overlapping region(s), and/or by dividing the area of the overlapping region(s) by a total area of the crop rows to determine a proportion (e.g., a percentage) of the crop rows expected to be damaged. In some examples, the crop damage calculation circuitry 208 provides the crop row metric(s) to the database 216 to be stored in association with the candidate guidance line.

In some examples, the crop damage calculation circuitry 208 repeats the above process for remaining one(s) of the candidate guidance lines to determine crop damage metric(s) associated respectively therewith. In some such examples, based on the crop damage metric(s) for respective one(s) of the candidate guidance lines, the crop damage calculation circuitry 208 selects one(s) of the candidate guidance lines to be traversed by the vehicle 102 during the second operation. For example, the crop damage calculation circuitry 208 can select one of the candidate guidance lines associated with a least amount of crop damage (e.g., the candidate guidance line for which the expected crop damage is less than the expected crop damage for remaining one(s) of the candidate guidance lines). In some examples, the crop damage calculation circuitry 208 can select the one of the candidate guidance lines based on a tradeoff between, for example, the expected crop damage and one or more example parameters associated with the respective candidate guidance lines (e.g., a total length of the candidate guidance line, an expected duration to traverse the candidate guidance line, a number of turns in the candidate guidance line, a travel speed along the candidate guidance line, a time to process the field by traversing the candidate guidance line, etc.). For example, the crop damage calculation circuitry 208 can select first one(s) of the candidate guidance lines that satisfy an example crop damage threshold (e.g., for which the expected crop damage is less than a threshold area and/or proportion of the crop rows), and can further select, from the first one(s) of the candidate guidance lines, second one(s) of the candidate guidance lines associated with, for example, a shortest total length, a shortest expected duration, a least number of turns, etc. In some examples, the crop damage calculation circuitry 208 identifies, based on the implement data 222 stored in the example database 216, one or more of the candidate implements corresponding to the selected one(s) of the candidate guidance lines. In some examples, the crop damage calculation circuitry 208 is instantiated by programmable circuitry executing crop damage calculation circuitry instructions and/or configured to perform operations such as those represented by the flowchart(s) of FIG. 5.

The secondary metric calculation circuitry 212 of FIG. 2 calculates and/or determines one or more example secondary metrics based on the crop damage metric(s) for one(s) of the candidate guidance lines and/or candidate implements. In some examples, the secondary metric(s) include at least one of an expected profit and/or change in profit (e.g., in dollars) or an expected yield (e.g., in bushels per acre) associated with the respective candidate guidance line(s) and/or the candidate implement(s). In some examples, the secondary metric calculation circuitry 212 determines a total area of the crop row locations in the field, and subtracts an area of the damaged crop (e.g., as indicated by the crop damage metric(s)) to determine an undamaged crop area of the field. In such examples, the secondary metric calculation circuitry 212 determines the expected yield by estimating and/or determining an amount (e.g., in bushels) of crop in the undamaged crop area, and dividing the crop amount by a size (e.g., in acres) of the field. In some examples, the secondary metric calculation circuitry 212 determines an expected profit associated with the undamaged crop area, and/or determines the expected profit loss associated with the damaged crop area. For example, the secondary metric calculation circuitry 212 can determine the expected profit and the expected profit loss by multiplying the undamaged crop area and the damaged crop area, respectively, by an expected profit per area, where the expected profit per area may be input by an operator (e.g., via the user input 226) and/or may be accessed from the database 216. In some examples, the secondary metric calculation circuitry 212 can determine relative differences in the expected profit and/or profit loss between different ones of the candidate guidance lines and/or the candidate implements. In some examples, the secondary metric calculation circuitry 212 can provide the secondary metric(s) to the database 216 to be stored in association with the corresponding candidate guidance line(s) and/or the candidate implement(s). In some examples, the secondary metric calculation circuitry 212 is instantiated by programmable circuitry executing secondary metric calculation circuitry instructions and/or configured to perform operations such as those represented by the flowchart(s) of FIG. 5.

The example user interface circuitry 210 of FIG. 2 generates and/or presents example display information 224 to an operator via the example user interface 110 of FIG. 1. For example, the user interface circuitry 210 can generate the display information 224 to include at least one of the candidate guidance line(s), the crop damage metric(s), or the secondary metric(s) associated with one(s) of the candidate implements. In some examples, the user interface circuitry 210 can indicate, via the display information 224, the selected one(s) of the candidate implements (e.g., selected by the crop damage calculation circuitry 208) to the operator. For example, the display information 224 can provide a recommendation to the operator to use the selected one(s) of the candidate implements for the second operation on the field. In some examples, the user interface 110 can present, via the display information 224, example metrics (e.g., the crop damage metric(s) and/or the secondary metric(s)) associated with multiple one(s) (e.g., all) of the candidate implements available to the operator, such that the operator can manually select the one(s) of the candidate implements based on the display information 224. In some examples, the operator can select, via the user input 226, one(s) of the candidate implements, and the user interface circuitry 210 can cause the user interface 110 to present and/or display information corresponding to the selected one(s) of the candidate implements.

In some examples, the user interface circuitry 210 generates one or more example maps corresponding to respective one(s) of the candidate implements. In some such examples, the map(s) represent the crop row locations on a field and/or one or more initial guidance lines traversed by a vehicle during a first operation on the field. Further, the map(s) can represent the candidate guidance line(s) for the second operation on the field, the tire track location(s), and/or position(s) of the vehicle 102 implementing the respective one(s) of the candidate implement(s). In some examples, one or more of the maps can be presented to the operator via the display information 224 to facilitate selection of one(s) of the candidate implements. Example maps that may by generated by the user interface circuitry 210 are described below in connection with FIGS. 4A, 4B, and/or 4C. In some examples, the user interface circuitry 210 is instantiated by programmable circuitry executing user interface circuitry instructions and/or configured to perform operations such as those represented by the flowchart(s) of FIG. 5.

The example communication circuitry 214 of FIG. 2 is communicatively coupled to the example network 106 of FIG. 1 to send, access, and/or obtain data via the network 106. In some examples, the communication circuitry 214 can send, via the network 106, one or more metrics (e.g., the crop damage metric(s) and/or the secondary metric(s)) to an example cloud-based storage environment for storage therein. Additionally or alternatively, the communication circuitry 214 can send the metric(s) and/or at least one of the location data 218, the vehicle data 220, and/or the implement data 222 to one or more instances of the implement selection circuitry 104 implemented at one or more different vehicles.

In some examples, the communication circuitry 214 can access and/or obtain (e.g., via the example network 106 of FIG. 1) data associated with multiple vehicles operating on multiple respective fields. For example, the communication circuitry 214 can be communicatively coupled to multiple ones of the vehicles to obtain example location data, example vehicle data, and/or example implement data associated therewith. In some examples, the communication circuitry 214 provides the obtained data to the row data determination circuitry 204, the path generation circuitry 206, and/or the crop damage calculation circuitry 208 to enable calculation of crop damage metrics for respective ones of the vehicles. In some examples, the crop damage calculation circuitry 208 can compare and/or evaluate the crop damage metrics to select one or more implements and/or operational widths that result in improved performance (e.g., reduced crop damage) compared to remaining one(s) of the implements and/or operational widths thereof.

Stated differently, the crop damage calculation circuitry 208 evaluates the crop damage metrics to determine one(s) of the implements and/or operational widths corresponding to a least amount of crop damage across a portion (e.g., all) of the multiple fields. In some examples, the selected one(s) of the implements and/or operational widths for the multiple fields are presented to an operator via the display information 224. In some examples, results obtained for the multiple fields can be used by the operator to select implement(s) for use in a given field, and/or can be used to facilitate design and/or manufacture of new implement(s).

In some examples, the communication circuitry 214 is communicatively coupled to an example vehicle control system (e.g., an autonomous steering system) of the example vehicle 102 of FIG. 1. In some such examples, the communication circuitry 214 can provide data to the vehicle control system to facilitate one or more operations of the vehicle 102. For example, the communication circuitry 214 can provide, to the vehicle control system, the generated guidance line(s) corresponding to the selected implement(s), such that the communication circuitry 214 causes the vehicle control system to steer (e.g., automatically steer) the vehicle 102 along the guidance line(s). In some examples, the communication circuitry 214 is instantiated by programmable circuitry executing communication circuitry instructions and/or configured to perform operations such as those represented by the flowchart(s) of FIG. 5.

Figure 3:
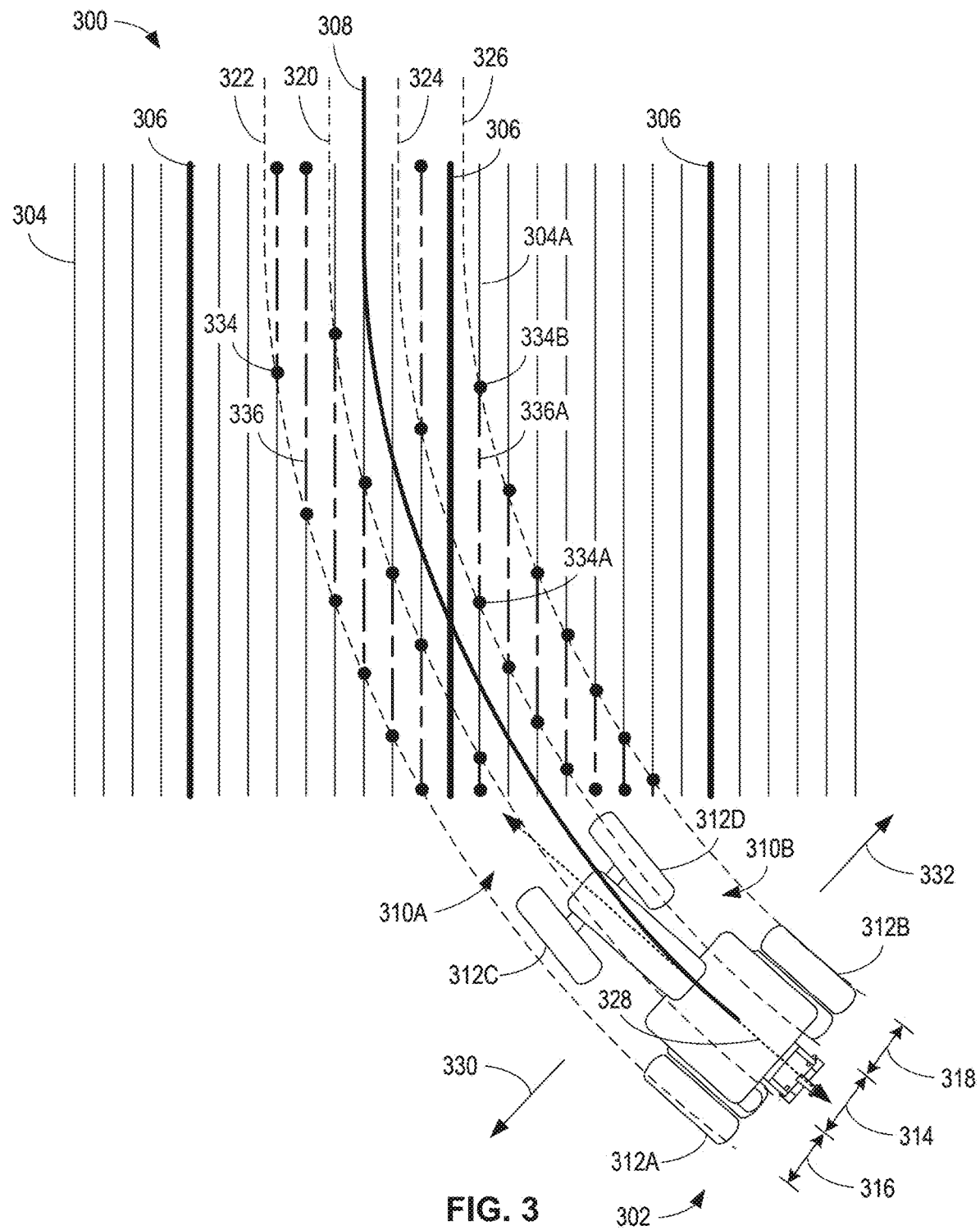
FIG. 3 illustrates an example field on which a second example operation is to be performed.

FIG. 3 illustrates a portion of an example field 300 on which a second example operation (e.g., a spraying operation, a harvesting operation, etc.) is to be performed by an example vehicle 302. In the illustrated example of FIG. 3, the field 300 includes example crop rows 304 generated and/or operated on during a first example operation on the field 300. Additionally, the field 300 includes first example guidance lines 306 representative of a path traversed by the vehicle 302 (e.g., and/or by a different vehicle) during the first operation, and a second example guidance line (e.g., a candidate guidance line) 308 to be traversed by the vehicle 302 during the second operation. In some examples, the vehicle 302 performs the first operation using a first example implement having a first example operational width, and the vehicle 302 is to perform the second operation using a second example implement having a second example operational width different from the first operational width. In some examples, because of the change in operational widths between the first and second operations, traversal of the first guidance line 306 during the second operation may result in one(s) of the crop rows 304 (e.g., and/or portion(s) thereof) not being operated on and/or may result in repeat operations on the one(s) of the crop rows 304. As such, the example implement selection circuitry 104 of FIGS. 1 and/or 2 generates, based on the second operational width, the second guidance line 308 to improve coverage of the one(s) of the crop rows 304.

In the illustrated example of FIG. 3, to facilitate determination of example crop damage metric(s) associated with the second guidance line 308 and/or the second implement, the implement selection circuitry 104 determines and/or predicts locations of example tire tracks 310A, 310B produced by the vehicle 302 when the vehicle 302 traverses the second guidance line 308. In this example, the implement selection circuitry 104 determines the first tire track 310A corresponding to a first example wheel (e.g., a first rear wheel, a left rear wheel) 312A of the vehicle 302 and the second tire track 310B corresponding to a second example wheel (e.g., a second rear wheel, a right rear wheel) 312B of the vehicle 302. While the first and second tire tracks 310A, 310B corresponding to the first and second wheels 312A, 312B are shown in this example, the implement selection circuitry 104 can, additionally or alternatively, determine tire track(s) corresponding to a third example wheel (e.g., a left front wheel) 312C and/or a fourth example wheel (e.g., a right front wheel) 312D of the vehicle 302.

In the illustrated example of FIG. 3, the implement selection circuitry 104 determines the tire tracks 310A, 310B based on example vehicle data associated with the vehicle 302, where the vehicle data includes a first example distance 314 between the first and second wheels 312A, 312B, a first tire width 316 of the first wheel 312C, and a second tire width 318 of the second wheel 312B. For example, the implement selection circuitry 104 determines a first inner boundary 320 and a first outer boundary 322 of the first tire track 310A, and a second inner boundary 324 and a second outer boundary 326 of the second tire track 310B. In this example, each of the boundaries 320, 322, 324, 326 has generally the same shape and/or curvature as the second guidance line 308, but is offset from a longitudinal axis 328 of the vehicle 302. In this example, the wheels 312A, 312B are spaced symmetrically about the longitudinal axis 328, such that the implement selection circuitry 104 determines the first inner boundary 320 is offset in a first direction (e.g., a leftward direction) 330 from the longitudinal axis 328 by approximately half of the first distance 314, and the second inner boundary 324 is offset in a second direction (e.g., a rightward direction) 332 from the longitudinal axis 328 by approximately half of the first distance 314. Further, the implement selection circuitry 104 determines the first outer boundary 322 is offset (e.g., in the first direction 330) from the first inner boundary 320 by the first tire width 316, and the second outer boundary 326 is offset (e.g., in the second direction 332) from the second inner boundary 324 by the second tire width 316. In some examples, the offset(s) between one(s) of the boundaries 320, 322, 324, 326 and the longitudinal axis 328 may be different.

In the illustrated example of FIG. 3, the implement selection circuitry 104 determines the first tire track 310A corresponds to a first area between the first inner and outer boundaries 320, 322, and the second tire track 310B corresponds to a second area between the second inner and outer boundaries 324, 326. In some examples, the implement selection circuitry 104 determines the crop damage metric(s) based on an overlap between the tire tracks 310A, 310B and one(s) of the crop rows 304 (and/or portions thereof). For example, the implement selection circuitry 104 determines example locations 334 at which the boundaries 320, 322, 324, 326 intersect one(s) of the crop rows 304, and identifies example damaged crop row portion(s) 336 between ones of the locations 334. In the illustrated example of FIG. 3, the implement selection circuitry 104 identifies a first location 334A at which the second inner boundary 324 intersects a first crop row 304A and a second location 334B at which the second outer boundary 326 intersects the first crop row 304A. In such an example, the implement selection circuitry 104 identifies a first damaged crop row portion 336A of the first crop row 304A between the first location 334A and the second location 334B.

In some examples, the implement selection circuitry 104 determines length(s) (e.g., individual length(s) and/or a total length) of the damaged crop row portion(s) 336, and determines an example crop damage area (e.g., a total crop damage area) by multiplying the length(s) by example crop width(s) of the corresponding crop rows 304. Additionally or alternatively, the implement selection circuitry 104 can determine a proportion (e.g., a percentage) of the crop damage area relative to a total area of the field 300. In some examples, the implement selection circuitry 104 stores the determined crop damage area and/or the determined proportion relative to the total area of the field as one or more example crop damage metrics associated with the second guidance line 308 and/or the second implement.

FIGS. 4A, 4B, and 4C illustrate first, second, and third example maps 402, 404, 406, respectively, that may be generated and/or output for presentation by the example implement selection circuitry 104 of FIGS. 1 and/or 2. For example, the maps 402, 404, 406 may be included in the example display information 224 generated by the example user interface circuitry 210 of FIG. 2 and/or presented to an operator (e.g., via the user interface 110 of FIG. 1, via a remote device, etc.). In the illustrated examples of FIGS. 4A, 4B, and/or 4C, the example maps 402, 404, 406 indicate locations of example crop rows 408 generated and/or operated on during a first example operation (e.g., a planting operation) on an example field, and further indicate a first example guidance line 410A traversed by a first example vehicle (e.g., the first vehicle 102A of FIG. 1) during the first example operation. In some examples, the first vehicle performs the first operation using a first example implement (e.g., the first implement 114A of FIG. 1) having a first example operational width, and the first guidance line 410 is generated and/or selected for the first vehicle based on the first operational width.

Turning to FIG. 4A, the first map 402 illustrates a second example vehicle 412A utilizing a second example implement 414A to perform a second example operation (e.g., a spraying operation, a harvesting operation, etc.) on the crop rows 408. In this example, the second implement 414A has a second example operational width, and the second operational width corresponds to the first operational width of the first implement used for the first operation. As such, a second example guidance line 416A generated for the second vehicle 412A for the second operation is substantially the same as the first guidance line 410 generated for the first operation.

Similarly, the second map 404 of FIG. 4B includes third example guidance lines 416B generated for a third example vehicle 412B utilizing a third example implement 414B, and the third map 406 of FIG. 4C illustrates fourth example guidance lines 416C generated for a fourth example vehicle 412C utilizing a fourth example implement 414C. In the illustrated example of FIG. 4B, the third implement 414B has a third example operational width that is approximately half of the first operational width of the first implement used during the first operation. As a result, the third vehicle 412B is to traverse two of the third guidance lines 416B to cover a same area of the field as the second vehicle 412A. Further, in the illustrated example of FIG. 4C, the fourth implement 416C has a fourth example operation width that is approximately one quarter of the first operational width (e.g., half of the third operational width). As a result, the fourth vehicle 412C is to traverse four of the fourth guidance lines 416C to cover a same area of the field as the second vehicle 412A and/or the third vehicle 412B.

In some examples, as a result of the vehicles 412A, 412B, 412C traversing different respective ones of the guidance lines 416A, 416B, 416C, one or more wheels of the vehicles 412A, 412B, 412C may run over and/or damage different portions of the crop rows 408. For example, the first map 402 of FIG. 4A includes a first example crop damage region 418A corresponding to the second vehicle 412A, the second map 404 of FIG. 4B includes a second example crop damage region 418B corresponding to the third vehicle 412B, and the third map 406 of FIG. 4C includes a third example crop damage region 418C corresponding to the fourth vehicle 412C. In some examples, the maps 402, 404, 406 can indicate the crop damage metric(s) corresponding to respective ones of the crop damage regions 418A, 418B, 418C, where the crop damage metric(s) can include total area(s) and/or proportion(s) of the crop damage region(s) 418A, 418B, 418C relative to a total area of the field. In some examples, the maps 402, 404, 406 are presented to an operator to facilitate selection of one of the implements 414A, 414B, 414C for use in performing the second operation.

In some examples, the implement selection circuitry 104 includes means for obtaining. For example, the means for obtaining may be implemented by the input interface circuitry 202. In some examples, the input interface circuitry 202 may be instantiated by programmable circuitry such as the example programmable circuitry 612 of FIG. 6. For instance, the input interface circuitry 202 may be instantiated by the example microprocessor 700 of FIG. 7 executing machine executable instructions such as those implemented by at least block 502 of FIG. 5. In some examples, the input interface circuitry 202 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the input interface circuitry 202 may be instantiated by any other combination of hardware, software, and/or firmware. For example, the input interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the implement selection circuitry 104 includes means for determining row data. For example, the means for determining row data may be implemented by the row data determination circuitry 204. In some examples, the row data determination circuitry 204 may be instantiated by programmable circuitry such as the example programmable circuitry 612 of FIG. 6. For instance, the row data determination circuitry 204 may be instantiated by the example microprocessor 700 of FIG. 7 executing machine executable instructions such as those implemented by at least block 504 of FIG. 5. In some examples, the row data determination circuitry 204 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the row data determination circuitry 204 may be instantiated by any other combination of hardware, software, and/or firmware. For example, the row data determination circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the implement selection circuitry 104 includes means for generating a path. For example, the means for generating a path may be implemented by the path generation circuitry 206. In some examples, the path generation circuitry 206 may be instantiated by programmable circuitry such as the example programmable circuitry 612 of FIG. 6. For instance, the path generation circuitry 206 may be instantiated by the example microprocessor 700 of FIG. 7 executing machine executable instructions such as those implemented by at least blocks 506, 508, 512 of FIG. 5. In some examples, the path generation circuitry 206 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the path generation circuitry 206 may be instantiated by any other combination of hardware, software, and/or firmware. For example, the path generation circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the implement selection circuitry 104 includes means for calculating crop damage. For example, the means for calculating crop damage may be implemented by the crop damage calculation circuitry 208. In some examples, the crop damage calculation circuitry 208 may be instantiated by programmable circuitry such as the example programmable circuitry 612 of FIG. 6. For instance, the crop damage calculation circuitry 208 may be instantiated by the example microprocessor 700 of FIG. 7 executing machine executable instructions such as those implemented by at least blocks 510, 514, 520, 524 of FIG. 5. In some examples, the crop damage calculation circuitry 208 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the crop damage calculation circuitry 208 may be instantiated by any other combination of hardware, software, and/or firmware. For example, the crop damage calculation circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the implement selection circuitry 104 includes means for generating display information. For example, the means for generating display information may be implemented by the user interface circuitry 210. In some examples, the user interface circuitry 210 may be instantiated by programmable circuitry such as the example programmable circuitry 612 of FIG. 6. For instance, the user interface circuitry 210 may be instantiated by the example microprocessor 700 of FIG. 7 executing machine executable instructions such as those implemented by at least block 518 of FIG. 5. In some examples, the user interface circuitry 210 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the user interface circuitry 210 may be instantiated by any other combination of hardware, software, and/or firmware. For example, the user interface circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the implement selection circuitry 104 includes means for calculating a secondary metric. For example, the means for calculating a secondary metric may be implemented by the secondary metric calculation circuitry 212. In some examples, the secondary metric calculation circuitry 212 may be instantiated by programmable circuitry such as the example programmable circuitry 612 of FIG. 6. For instance, the secondary metric calculation circuitry 212 may be instantiated by the example microprocessor 700 of FIG. 7 executing machine executable instructions such as those implemented by at least block 516 of FIG. 5. In some examples, the secondary metric calculation circuitry 212 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the secondary metric calculation circuitry 212 may be instantiated by any other combination of hardware, software, and/or firmware. For example, the secondary metric calculation circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the implement selection circuitry 104 includes means for communicating. For example, the means for communicating may be implemented by the communication circuitry 214. In some examples, the communication circuitry 214 may be instantiated by programmable circuitry such as the example programmable circuitry 612 of FIG. 6. For instance, the communication circuitry 214 may be instantiated by the example microprocessor 700 of FIG. 7 executing machine executable instructions such as those implemented by at least block 522 of FIG. 5. In some examples, the communication circuitry 214 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the communication circuitry 214 may be instantiated by any other combination of hardware, software, and/or firmware. For example, the communication circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the implement selection circuitry 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example input interface circuitry 202, the example row data determination circuitry 204, the example path generation circuitry 206, the example crop damage calculation circuitry 208, the example user interface circuitry 210, the example secondary metric calculation circuitry 212, the example communication circuitry 214, the example database 216, and/or, more generally, the example implement selection circuitry 104 of FIG. 2, may be implemented by hardware alone or by hardware in combination with software and/or firmware. Thus, for example, any of the example input interface circuitry 202, the example row data determination circuitry 204, the example path generation circuitry 206, the example crop damage calculation circuitry 208, the example user interface circuitry 210, the example secondary metric calculation circuitry 212, the example communication circuitry 214, the example database 216, and/or, more generally, the example implement selection circuitry 104, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example implement selection circuitry 104 of FIG. 2 may include one or more elements, processes, and/or devices in addition to, or instead of, those illustrated in FIG. 2, and/or may include more than one of any or all of the illustrated elements, processes and devices.

Figure 5:
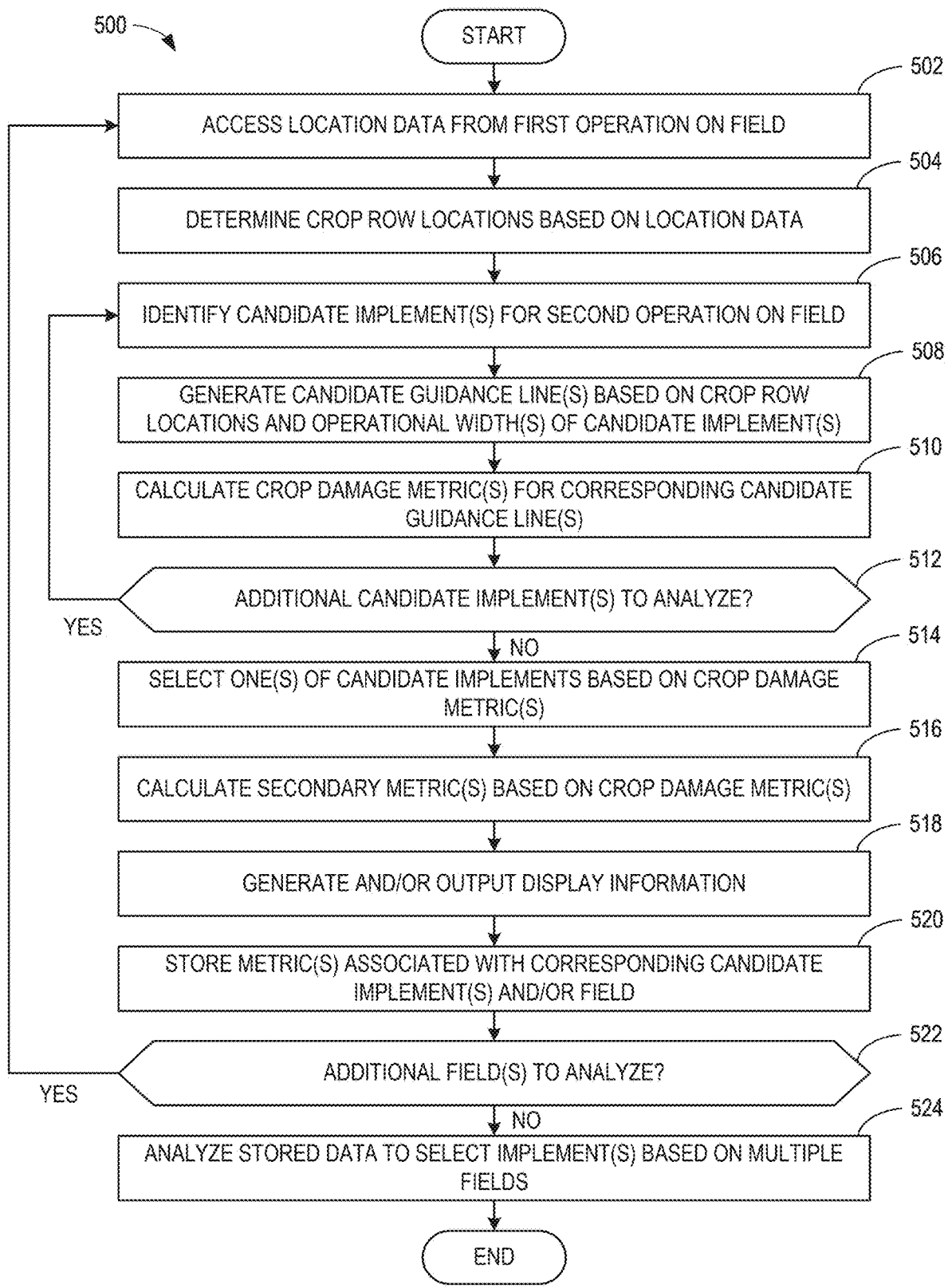
FIG. 5 is a flowchart representative of example machine readable instructions and/or example operations that may be executed, instantiated, and/or performed by programmable circuitry to implement the implement selection circuitry of FIG. 2.

A flowchart representative of example machine readable instructions, which may be executed by programmable circuitry to implement and/or instantiate the implement selection circuitry 104 of FIG. 2 and/or representative of example operations which may be performed by programmable circuitry to implement and/or instantiate the implement selection circuitry 104 of FIG. 2, is shown in FIG. 5. The machine readable instructions may be one or more executable programs or portion(s) of one or more executable programs for execution by programmable circuitry such as the programmable circuitry 612 shown in the example processor platform 600 discussed below in connection with FIG. 6 and/or may be one or more function(s) or portion(s) of functions to be performed by the example programmable circuitry (e.g., an FPGA) discussed below in connection with FIGS. 7 and/or 8. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 5, many other methods of implementing the example implement selection circuitry 104 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 5 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 5 is a flowchart representative of example machine readable instructions and/or example operations 500 that may be executed, instantiated, and/or performed by programmable circuitry to implement the example implement selection circuitry 104 of FIGS. 1 and/or 2. The example machine-readable instructions and/or the example operations 500 of FIG. 5 begin at block 502, at which the example implement selection circuitry 104 accesses the example location data 218 associated with a first example operation (e.g., planting) performed by a vehicle (e.g., the vehicle 102 of FIG. 1) on an example field. For example, the example input interface circuitry 202 of FIG. 2 accesses and/or obtains the location data 218 from the example GPS sensor 108 of the vehicle 102, where the location data 218 represents locations (e.g., geographic locations) of the vehicle 102 at corresponding points in time during the first operation.

At block 504, the example implement selection circuitry 104 determines example crop row locations based on the location data 218. For example, the example row data determination circuitry 204 of FIG. 2 accesses the location data 218 and/or the example implement data 222 of FIG. 2, where the implement data 222 includes a first example operational width of a first example implement used by the vehicle 102 (e.g., and/or a different vehicle) to perform the first operation. In some examples, based on the first operational width of the first implement and/or based on a first example guidance line traversed by the vehicle 102 during the first operation (e.g., represented in the location data 218), the row data determination circuitry 204 determines the crop row locations of crop rows planted in the field.

At block 506, the example implement selection circuitry 104 identifies one or more example candidate implements that may be used (e.g., by the vehicle 102) to perform a second example operation (e.g., spraying, harvesting, etc.) on the field. For example, the example path generation circuitry 206 of FIG. 2 identifies the second operation to be performed based on, for example, the example user input 226 to the example user interface 110 of FIG. 1. Further, the path generation circuitry 206 identifies and/or selects, from one or more example implements represented in the implement data 222, one or more example candidate implements that can be used to perform the second operation.

At block 508, the example implement selection circuitry 104 generates one or more example candidate guidance lines for the respective candidate implement(s) based on the crop row locations and example operational width(s) of the candidate implement(s). For example, the example path generation circuitry 206 determines the operational width(s) for corresponding one(s) of the candidate implement(s) based on the implement data 222. Based on the operational width(s), the path generation circuitry 206 generates the candidate guidance line(s) along which the vehicle 102 can traverse to perform the second operation on the crop row locations using the respective candidate implement(s). In some examples, the path generation circuitry 206 executes one or more example path planning algorithms based on the crop row locations and/or the operational width(s) to output the candidate guidance line(s).

At block 510, the example implement selection circuitry 104 calculates one or more example crop damage metric(s) for corresponding one(s) of the candidate guidance line(s) and/or candidate implement(s). For example the example crop damage calculation circuitry 208 of FIG. 2 calculates and/or determines the crop damage metric(s) by determining example tire track locations of the vehicle 102 when traversing along the respective candidate guidance line(s), and identifying overlapping regions between the tire track locations and the crop row locations in the field. In some examples, the crop damage calculation circuitry 208 determines the crop damage metric(s) corresponding to an amount (e.g., an area, a percentage, etc.) of the overlap between the tire track locations and the crop row locations.

At block 512, the example implement selection circuitry 104 determines whether there are any additional candidate implements to analyze. For example, the path generation circuitry 206 determines whether there is at least one additional candidate implement (e.g., represented in the implement data 222) that may be used to perform the second operation on the field. In response to the path generation circuitry 206 determining that there is at least one additional candidate implement to analyze (e.g., block 512 returns a result of YES), control returns to block 506. Alternatively, in response to the path generation circuitry 206 determining that there are no additional candidate implements to analyze (e.g., block 512 returns a result of NO), control proceeds to block 514.

At block 514, the example implement selection circuitry 104 selects one(s) of the candidate implement(s) based on the corresponding crop damage metric(s). For example, the crop damage calculation circuitry 208 selects the one(s) of the candidate implement(s) corresponding to the least expected crop damage (e.g., as represented in the crop damage metric(s)) compared to remaining one(s) of the candidate implement(s). In some examples, the crop damage calculation circuitry 208 selects the one(s) of the candidate implement(s) based on a tradeoff between the expected crop damage and one or more example parameters associated with the candidate guidance line(s) of the corresponding candidate implement(s). For example, the parameter(s) can include total length(s) of the candidate guidance line(s), expected duration(s) to traverse the candidate guidance line(s), number(s) of turns in the candidate guidance line(s), etc.

At block 516, the example implement selection circuitry 104 calculates one or more example secondary metric(s) based on the crop damage metric(s). For example, the example secondary metric calculation circuitry 212 of FIG. 2 calculates the secondary metric(s) corresponding to one(s) of the candidate implement(s), where the secondary metric(s) include at least one of an expected profit and/or an expected yield associated with the respective candidate implement(s). In some examples, the secondary metric calculation circuitry 212 calculates the secondary metric(s) based on the area(s) of damaged crop and/or undamaged crop (e.g., as represented in the crop damage metric(s)) expected for one(s) of the candidate implement(s).

At block 518, the example implement selection circuitry 104 generates and/or outputs the example display information 224 for presentation to an operator. For example, the example user interface circuitry 210 generates the display information 224 corresponding to one(s) of the candidate implement(s), where the display information 224 can include at least one of the candidate guidance line(s), the crop damage metric(s), or the secondary metric(s) associated with one(s) of the candidate implements. In some examples, the user interface circuitry 210 causes presentation of the display information 224 to the operator (e.g., via the example user interface 110 of FIG. 1) to facilitate selection of one of the candidate implements for use during a second operation.

At block 520, the example implement selection circuitry 104 stores one or more example metrics associated with the candidate implement(s) and/or the field. For example, the crop damage calculation circuitry 208 provides the crop damage metric(s) to the example database 216 to be stored in association with information (e.g., the implement data 222) corresponding to the candidate implement(s) and/or the field on which the second operation is to be performed. Additionally or alternatively, the secondary metric calculation circuitry 212 provides the secondary metric(s) to the example database 216 for storage therein.

At block 522, the example implement selection circuitry 104 determines whether there are one or more additional fields to analyze. For example, the example communication circuitry 214 determines whether additional example data (e.g., vehicle data, implement data, location data, etc.) is available for one or more additional fields. For example, the communication circuitry 214 can access and/or obtain (e.g., via the example network 106 of FIG. 1) the additional data from one or more different vehicles operating on the additional field(s). In response to the communication circuitry 214 determining that there are additional field(s) to analyze (e.g., block 522 returns a result of YES), control returns to block 502. Alternatively, in response to the communication circuitry 214 determining that there are no additional fields to analyze (e.g., block 522 returns a result of NO), control proceeds to block 524.

At block 524, the example implement selection circuitry 104 analyzes example data stored in the database 216 to select implement(s) based on multiple fields. For example, the crop damage calculation circuitry 208 can access the crop damage metrics determined for multiple implements based on respective different one(s) of the multiple fields, and the crop damage calculation circuitry 208 can evaluate and/or compare the crop damage metrics to select one(s) of the implements. In some examples, the crop damage calculation circuitry 208 selects the one(s) of the implements that results in a least amount of crop damage across the multiple fields (e.g., compared to remaining one(s) of the implements). In some examples, information (e.g., operational width(s)) associated with the selected implement(s) can be stored and/or presented to an operator via the display information 224.

Figure 6:
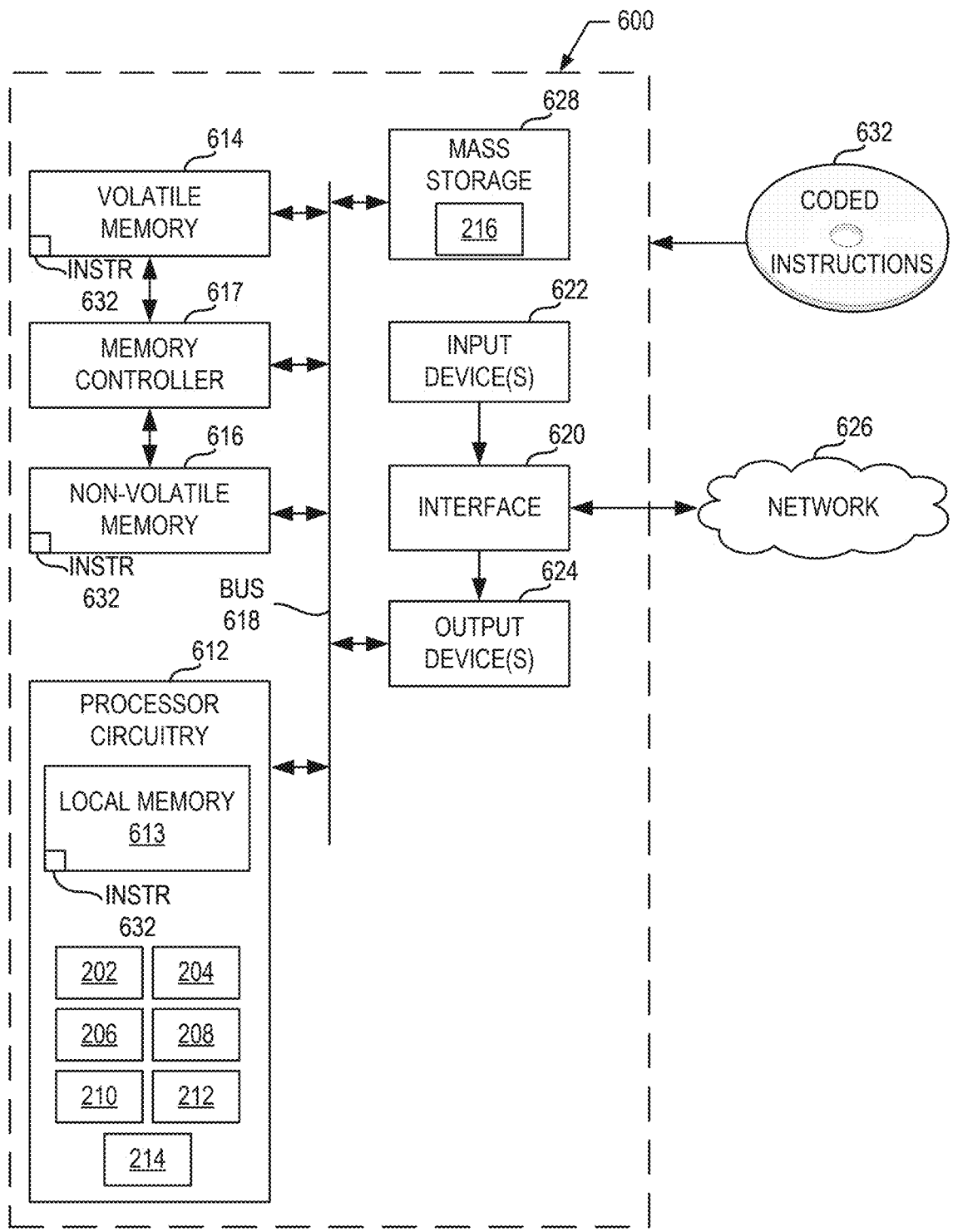
FIG. 6 is a block diagram of an example processing platform including programmable circuitry structured to execute, instantiate, and/or perform the example machine readable instructions and/or perform the example operations of FIG. 5 to implement the implement selection circuitry of FIG. 2.

FIG. 6 is a block diagram of an example programmable circuitry platform 600 structured to execute and/or instantiate the example machine-readable instructions and/or the example operations of FIG. 5 to implement the implement selection circuitry 104 of FIG. 2. The programmable circuitry platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the example input interface circuitry 202, the example row data determination circuitry 204, the example path generation circuitry 206, the example crop damage calculation circuitry 208, the example user interface circuitry 210, the example secondary metric calculation circuitry 212, the example communication circuitry 214, and the example database 216.

The programmable circuitry 612 of the illustrated example includes a local memory 613 (e.g., a cache, registers, etc.). The programmable circuitry 612 of the illustrated example is in communication with main memory 614, 616, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can be implemented by, for example, an audio sensor, a microphone, a camera (still or video), a keyboard, a button, a mouse, a touchscreen, a trackpad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 632, which may be implemented by the machine readable instructions of FIG. 5, may be stored in the mass storage device 628, in the volatile memory 614, in the non-volatile memory 616, and/or on at least one non-transitory computer readable storage medium such as a CD or DVD which may be removable.

Figure 7:
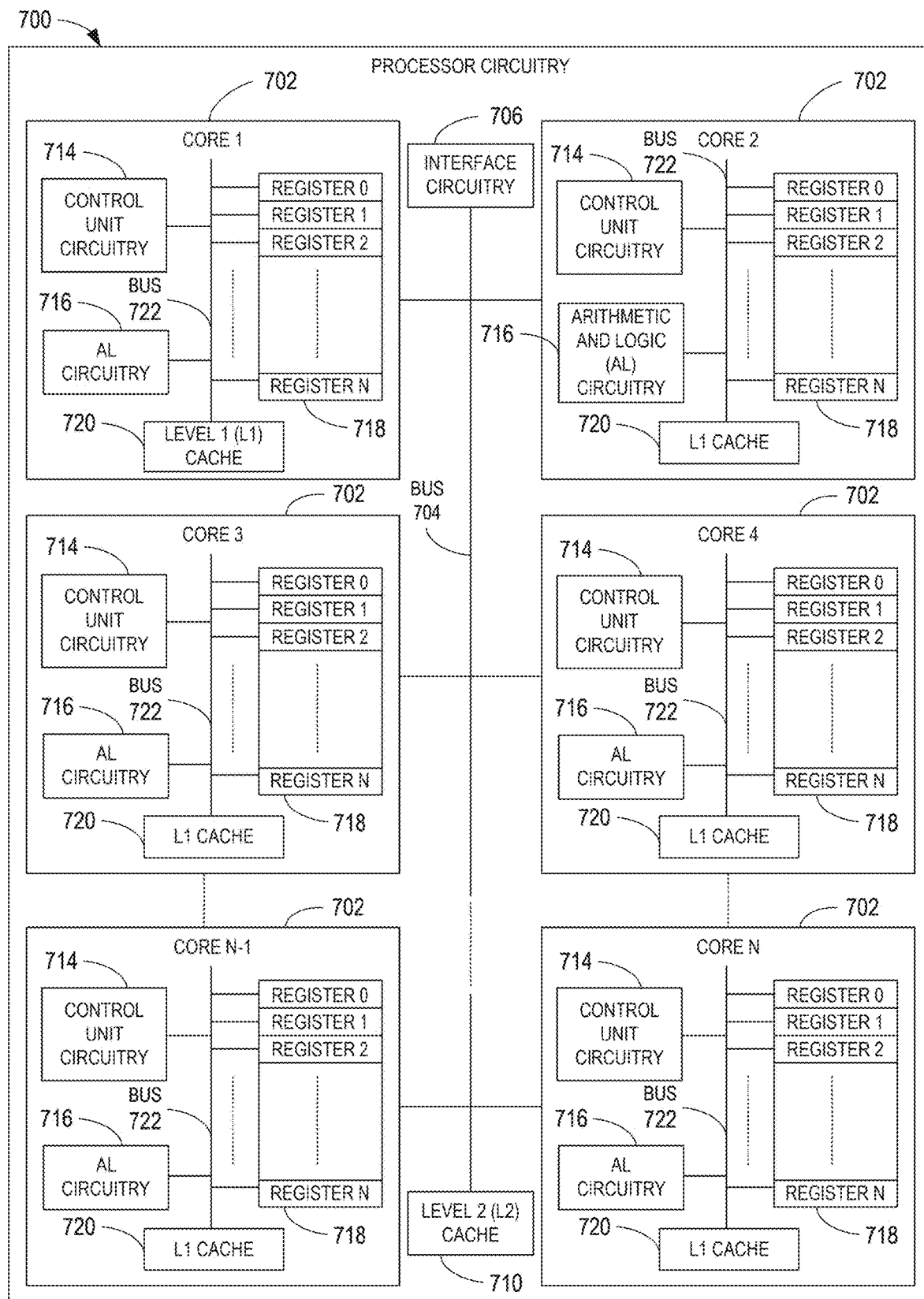
FIG. 7 is a block diagram of an example implementation of the programmable circuitry of FIG. 6.

FIG. 7 is a block diagram of an example implementation of the programmable circuitry 612 of FIG. 6. In this example, the programmable circuitry 612 of FIG. 6 is implemented by a microprocessor 700. For example, the microprocessor 700 may be a general-purpose microprocessor (e.g., general-purpose microprocessor circuitry). The microprocessor 700 executes some or all of the machine-readable instructions of the flowchart of FIG. 5 to effectively instantiate the circuitry of FIG. 2 as logic circuits to perform operations corresponding to those machine readable instructions. In some such examples, the circuitry of FIG. 2 is instantiated by the hardware circuits of the microprocessor 700 in combination with the machine-readable instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIG. 5.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706.

Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating-point operations. In yet other examples, the AL circuitry 716 may include first AL circuitry that performs integer-based operations and second AL circuitry that performs floating-point operations. In some examples, the AL circuitry 716 may be referred to as an Arithmetic Logic Unit (ALU).

The registers 718 are semiconductor-based structures to store data and/or instructions such as results of one or more of the operations performed by the AL circuitry 716 of the corresponding core 702. For example, the registers 718 may include vector register(s), SIMD register(s), general-purpose register(s), flag register(s), segment register(s), machine-specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure, such as by being distributed throughout the core 702 to shorten access time. The second bus 722 may be implemented by at least one of an I2C bus, a SPI bus, a PCI bus, or a PCIe bus.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages.

The microprocessor 700 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 700, in the same chip package as the microprocessor 700 and/or in one or more separate packages from the microprocessor 700.

Figure 8:
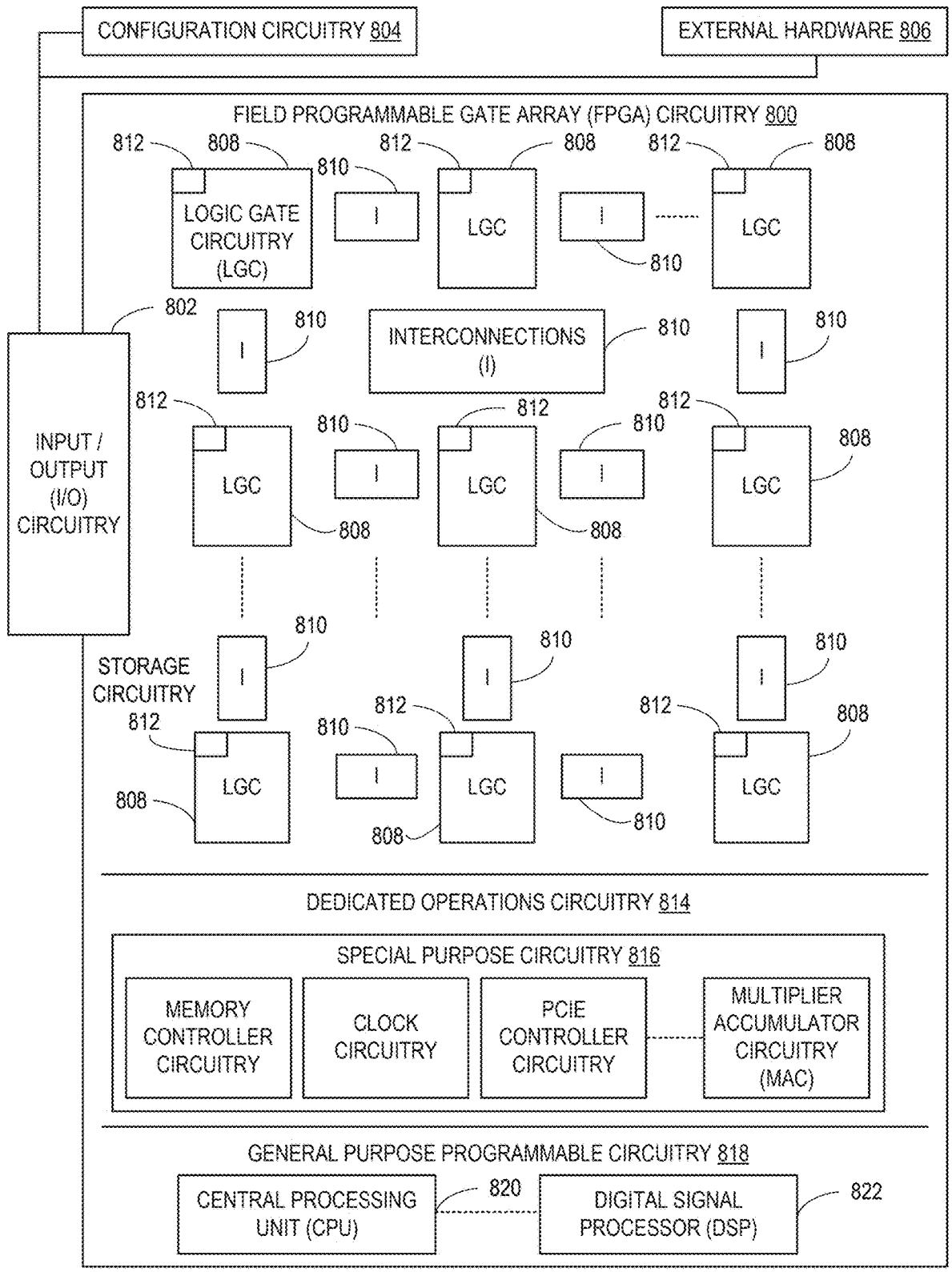
FIG. 8 is a block diagram of another example implementation of the programmable circuitry of FIG. 6.

FIG. 8 is a block diagram of another example implementation of the programmable circuitry 612 of FIG. 6. In this example, the programmable circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 700 of FIG. 7 described above (which is a general purpose device that may be programmed to execute some or all of the machine readable instructions represented by the flowchart(s) of FIG. 5 but whose interconnections and logic circuitry are fixed once fabricated), the FPGA circuitry 800 of the example of FIG. 8 includes interconnections and logic circuitry that may be configured, structured, programmed, and/or interconnected in different ways after fabrication to instantiate, for example, some or all of the operations/functions corresponding to the machine readable instructions represented by the flowchart(s) of FIG. 5. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIG. 5. As such, the FPGA circuitry 800 may be configured and/or structured to effectively instantiate some or all of the operations/functions corresponding to the machine readable instructions of the flowchart(s) of FIG. 5 as dedicated logic circuits to perform the operations/functions corresponding to those software instructions in a dedicated manner analogous to an ASIC. Therefore, the FPGA circuitry 800 may perform the operations/functions corresponding to the some or all of the machine readable instructions of FIG. 5 faster than the general-purpose microprocessor can execute the same.

In the example of FIG. 8, the FPGA circuitry 800 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain a binary file, which may be implemented by a bit stream, data, and/or machine-readable instructions, to configure the FPGA circuitry 800, or portion(s) thereof. In some such examples, the configuration circuitry 804 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 806 may be implemented by external hardware circuitry. For example, the external hardware 806 may be implemented by the microprocessor 700 of FIG. 7.

The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations/functions that may correspond to at least some of the machine readable instructions of FIG. 5 and/or other desired operations. The logic gate circuitry 808 shown in FIG. 8 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations/ functions. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example dedicated operations circuitry 814. In this example, the dedicated operations circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the programmable circuitry 612 of FIG. 6, many other approaches are contemplated. For example, FPGA circuitry may include an on-board CPU, such as one or more of the example CPU 820 of FIG. 7. Therefore, the programmable circuitry 612 of FIG. 6 may additionally be implemented by combining at least the example microprocessor 700 of FIG. 7 and the example FPGA circuitry 800 of FIG. 8. In some such hybrid examples, one or more cores 702 of FIG. 7 may execute a first portion of the machine readable instructions represented by the flowchart(s) of FIG. 5 to perform first operation(s)/function(s), the FPGA circuitry 800 of FIG. 8 may be configured and/or structured to perform second operation(s)/function(s) corresponding to a second portion of the machine readable instructions represented by the flowchart of FIG. 5, and/or an ASIC may be configured and/or structured to perform third operation(s)/ function(s) corresponding to a third portion of the machine readable instructions represented by the flowchart of FIG. 5.

It should be understood that some or all of the circuitry of FIG. 2 may, thus, be instantiated at the same or different times. For example, same and/or different portion(s) of the microprocessor 700 of FIG. 7 may be programmed to execute portion(s) of machine-readable instructions at the same and/or different times. In some examples, same and/or different portion(s) of the FPGA circuitry 800 of FIG. 8 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 700 of FIG. 7 may execute machine readable instructions in one or more threads executing concurrently and/or in series. In some examples, the FPGA circuitry 800 of FIG. 8 may be configured and/or structured to carry out operations/functions concurrently and/or in series. Moreover, in some examples, some or all of the circuitry of FIG. 2 may be implemented within one or more virtual machines and/or containers executing on the microprocessor 700 of FIG. 7.

In some examples, the programmable circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the programmable circuitry 612 of FIG. 6, which may be in one or more packages. For example, the XPU may include a CPU (e.g., the microprocessor 700 of FIG. 7, the CPU 820 of FIG. 8, etc.) in one package, a DSP (e.g., the DSP 822 of FIG. 8) in another package, a GPU in yet another package, and an FPGA (e.g., the FPGA circuitry 800 of FIG. 8) in still yet another package.

Figure 9:
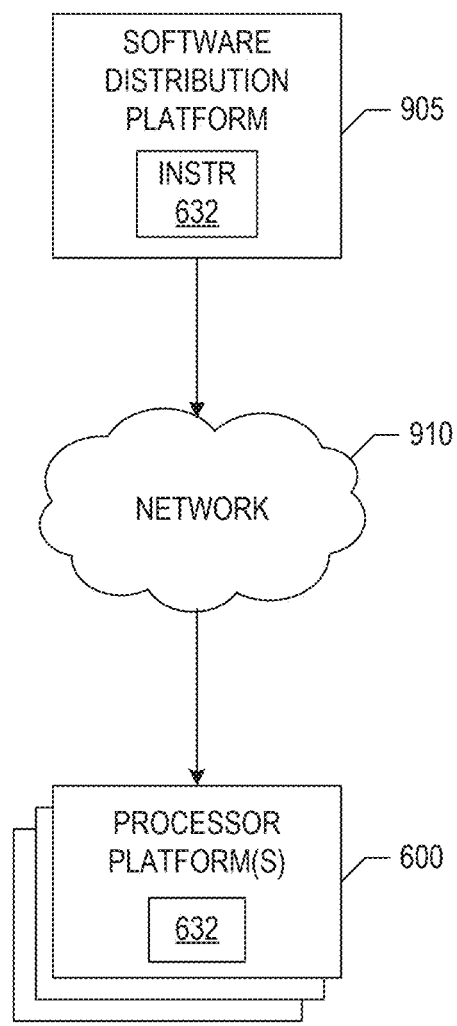
FIG. 9 is a block diagram of an example software/firmware/instructions distribution platform (e.g., one or more servers) to distribute software, instructions, and/or firmware (e.g., corresponding to the example machine readable instructions of FIG. 5) to client devices associated with end users and/or consumers (e.g., for license, sale, and/or use), retailers (e.g., for sale, re-sale, license, and/or sub-license), and/or original equipment manufacturers (OEMs)

A block diagram illustrating an example software distribution platform 905 to distribute software such as the example machine readable instructions 632 of FIG. 6 to other hardware devices (e.g., hardware devices owned and/ or operated by third parties from the owner and/or operator of the software distribution platform) is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions of FIG. 5, as described above. The one or more servers of the example software distribution platform 905 are in communication with an example network 910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions of FIG. 5, may be downloaded to the example programmable circuitry platform 600, which is to execute the machine readable instructions 632 to implement the implement selection circuitry 104. In some examples, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Notwithstanding the foregoing, in the case of referencing a semiconductor device (e.g., a transistor), a semiconductor die containing a semiconductor device, and/or an integrated circuit (IC) package containing a semiconductor die during fabrication or manufacturing, "above" is not with reference to Earth, but instead is with reference to an underlying substrate on which relevant components are fabricated, assembled, mounted, supported, or otherwise provided. Thus, as used herein and unless otherwise stated or implied from the context, a first component within a semiconductor die (e.g., a transistor or other semiconductor device) is "above" a second component within the semiconductor die when the first component is farther away from a substrate (e.g., a semiconductor wafer) during fabrication/manufacturing than the second component on which the two components are fabricated or otherwise provided. Similarly, unless otherwise stated or implied from the context, a first component within an IC package (e.g., a semiconductor die) is "above" a second component within the IC package during fabrication when the first component is farther away from a printed circuit board (PCB) to which the IC package is to be mounted or attached. It is to be understood that semiconductor devices are often used in orientation different than their orientation during fabrication. Thus, when referring to a semiconductor device (e.g., a transistor), a semiconductor die containing a semiconductor device, and/or an integrated circuit (IC) package containing a semiconductor die during use, the definition of "above" in the preceding paragraph (i.e., the term "above" describes the relationship of two parts relative to Earth) will likely govern based on the usage context.

As used in this patent, stating that any part (e.g., a layer, film, are a, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the described examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been described that reduce crop damage by selecting operational width(s) of implement(s) to be used with an agricultural vehicle. Examples described herein generate example candidate guidance lines to be traversed by the vehicle during an example operation on a field, where the candidate guidance lines are generated based on respective different implements having respective different operational widths. Further, described examples calculate one or more example crop damage metrics (e.g., crop damage area(s) and/or proportion(s) of the crop damage area(s) relative to area(s) of the field) associated with crop damage that is expected to occur when the vehicle traverses corresponding one(s) of the candidate guidance lines. Disclosed examples select, based on the crop damage metric(s), one(s) of the implements to be used for the operation on the field, where the selected implement(s) are expected to result in reduced crop damage (e.g., compared to remaining one(s) of the implements). Advantageously, examples described herein may reduce crop damage resulting from one or more operations on a field, thus improving yield and/or profit associated with the crops in the field. Further, by automatically generating guidance paths for steering a vehicle based on implement(s) to be utilized by the vehicle, described systems, apparatus, articles of manufacture, and methods improve the efficiency of using a computing device by reducing an amount of user input to be requested from an operator. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to select operational widths of implements for an agricultural vehicle are described herein. Further examples and combinations thereof include the following:

Example 1 includes an apparatus comprising interface circuitry, machine-readable instructions, and at least one processor circuit to be programmed by the machine-readable instructions to identify a first implement and a second implement available for a second operation on a field, the second operation to be performed after a first operation on the field, the first implement having a first operational width, the second implement having a second operational width different from the first operational width, generate a first guidance line and a second guidance line for the second operation, the first guidance line based on the first operational width and location data from a vehicle during the first operation, the second guidance line based on the second operational width and the location data, calculate a first crop damage metric corresponding to the first guidance line and a second crop damage metric corresponding to the second guidance line, and select one of the first implement or the second implement based on the first crop damage metric and the second crop damage metric.

Example 2 includes the apparatus of example 1, wherein one or more of the at least one processor circuit is to determine at least one secondary metric based on at least one of the first crop damage metric or the second crop damage metric, the at least one secondary metric including at least one of an expected crop yield or an expected profit associated with at least one of the first implement or the second implement.

Example 3 includes the apparatus of example 1, wherein one or more of the at least one processor circuit is to cause steering of the vehicle along one of the first guidance line or the second guidance line corresponding to the selected one of the first implement or the second implement.

Example 4 includes the apparatus of example 1, wherein one or more of the at least one processor circuit is to calculate the first crop damage metric based on a first area of overlap between crop row locations and first tire tracks of the vehicle along the first guidance line, and calculate the second crop damage metric based on a second area of overlap between the crop row locations and second tire tracks of the vehicle along the second guidance line.

Example 5 includes the apparatus of example 1, wherein one or more of the at least one processor circuit is to select the first implement in response to determining the first crop damage metric is less than the second crop damage metric, and select the second implement in response to determining the second crop damage metric is less than the first crop damage metric.

Example 6 includes the apparatus of example 1, wherein the field is a first field, and wherein one or more of the at least one processor circuit is to select the selected one of the first implement or the second implement for use in performing a third operation on a second field, the second field different from the first field.

Example 7 includes the apparatus of example 1, wherein one or more of the at least one processor circuit is to present, via a user interface, display information corresponding to the selected one of the first implement or the second implement.

Example 8 includes At least one non-transitory machine-readable medium comprising machine-readable instructions to cause at least one processor circuit to at least identify a first implement and a second implement available for a second operation on a field, the second operation to be performed after a first operation on the field, the first implement having a first operational width, the second implement having a second operational width different from the first operational width, generate a first guidance line and a second guidance line for the second operation, the first guidance line based on the first operational width and location data from a vehicle during the first operation, the second guidance line based on the second operational width and the location data, calculate a first crop damage metric corresponding to the first guidance line and a second crop damage metric corresponding to the second guidance line, and select one of the first implement or the second implement based on the first crop damage metric and the second crop damage metric.

Example 9 includes the at least one non-transitory machine-readable medium of example 8, wherein the machine-readable instructions are to cause one or more of the at least one processor circuit to determine at least one secondary metric based on at least one of the first crop damage metric or the second crop damage metric, the at least one secondary metric including at least one of an expected crop yield or an expected profit associated with at least one of the first implement or the second implement.

Example 10 includes the at least one non-transitory machine-readable medium of example 8, wherein the machine-readable instructions are to cause one or more of the at least one processor circuit to cause steering of the vehicle along one of the first guidance line or the second guidance line corresponding to the selected one of the first implement or the second implement.

Example 11 includes the at least one non-transitory machine-readable medium of example 8, wherein the machine-readable instructions are to cause one or more of the at least one processor circuit to calculate the first crop damage metric based on a first area of overlap between crop row locations and first tire tracks of the vehicle along the first guidance line, and calculate the second crop damage metric based on a second area of overlap between the crop row locations and second tire tracks of the vehicle along the second guidance line.

Example 12 includes the at least one non-transitory machine-readable medium of example 8, wherein the machine-readable instructions are to cause one or more of the at least one processor circuit to select the first implement in response to determining the first crop damage metric is less than the second crop damage metric, and select the second implement in response to determining the second crop damage metric is less than the first crop damage metric.

Example 13 includes the at least one non-transitory machine-readable medium of example 8, wherein the field is a first field, and wherein the machine-readable instructions are to cause one or more of the at least one processor circuit to select the selected one of the first implement or the second implement for use in performing a third operation on a second field, the second field different from the first field.

Example 14 includes the at least one non-transitory machine-readable medium of example 8, wherein the machine-readable instructions are to cause one or more of the at least one processor circuit to present, via a user interface, display information corresponding to the selected one of the first implement or the second implement.

Example 15 includes a method comprising identifying a first implement and a second implement available for a second operation on a field, the second operation to be performed after a first operation on the field, the first implement having a first operational width, the second implement having a second operational width different from the first operational width, generating a first guidance line and a second guidance line for the second operation, the first guidance line based on the first operational width and location data from a vehicle during the first operation, the second guidance line based on the second operational width and the location data, calculating, by at least one processor circuit programmed by at least one instruction, a first crop damage metric corresponding to the first guidance line and a second crop damage metric corresponding to the second guidance line, and selecting, by one or more of the at least one processor circuit, one of the first implement or the second implement based on the first crop damage metric and the second crop damage metric.

Example 16 includes the method of example 15, further including determining at least one secondary metric based on at least one of the first crop damage metric or the second crop damage metric, the at least one secondary metric including at least one of an expected crop yield or an expected profit associated with at least one of the first implement or the second implement.

Example 17 includes the method of example 15, further including causing steering of the vehicle along one of the first guidance line or the second guidance line corresponding to the selected one of the first implement or the second implement.

Example 18 includes the method of example 15, further including calculating the first crop damage metric based on a first area of overlap between crop row locations and first tire tracks of the vehicle along the first guidance line, and calculating the second crop damage metric based on a second area of overlap between the crop row locations and second tire tracks of the vehicle along the second guidance line.

Example 19 includes the method of example 15, further including selecting the first implement in response to determining the first crop damage metric is less than the second crop damage metric, and selecting the second implement in response to determining the second crop damage metric is less than the first crop damage metric.

Example 20 includes the method of example 15, wherein the field is a first field, further including selecting the selected one of the first implement or the second implement for use in performing a third operation on a second field, the second field different from the first field.

The following claims are hereby incorporated into this Detailed Description by this reference. Although certain example systems, apparatus, articles of manufacture, and methods have been described herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
    interface circuitry;
    machine-readable instructions; and
    at least one processor circuit to be programmed by the machine-readable instructions to:
        identify a first implement and a second implement available for a second operation on a field, the second operation to be performed after a first operation on the field, the first implement having a first operational width, the second implement having a second operational width different from the first operational width;
        generate a first guidance line and a second guidance line for the second operation, the first guidance line based on the first operational width and location data from a vehicle during the first operation, the second guidance line based on the second operational width and the location data;
        calculate a first crop damage metric corresponding to the first guidance line and a second crop damage metric corresponding to the second guidance line;
        select one of the first implement or the second implement based on the first crop damage metric and the second crop damage metric; and
        cause steering of the vehicle along one of the first guidance line or the second guidance line corresponding to the selected one of the first implement or the second implement.

2. The apparatus of claim 1, wherein one or more of the at least one processor circuit is to determine at least one secondary metric based on at least one of the first crop damage metric or the second crop damage metric, the at least one secondary metric including at least one of an expected crop yield or an expected profit associated with at least one of the first implement or the second implement.

3. The apparatus of claim 1, wherein one or more of the at least one processor circuit is to:
    calculate the first crop damage metric based on a first area of overlap between crop row locations and first tire tracks of the vehicle along the first guidance line; and
    calculate the second crop damage metric based on a second area of overlap between the crop row locations and second tire tracks of the vehicle along the second guidance line.

4. The apparatus of claim 1, wherein one or more of the at least one processor circuit is to:
    select the first implement in response to determining the first crop damage metric is less than the second crop damage metric; and
    select the second implement in response to determining the second crop damage metric is less than the first crop damage metric.

5. The apparatus of claim 1, wherein the field is a first field, and wherein one or more of the at least one processor circuit is to select the selected one of the first implement or the second implement for use in performing a third operation on a second field, the second field different from the first field.

6. The apparatus of claim 1, wherein one or more of the at least one processor circuit is to present, via a user interface, display information corresponding to the selected one of the first implement or the second implement.

7. At least one non-transitory machine-readable medium comprising machine-readable instructions to cause at least one processor circuit to at least:
    identify a first implement and a second implement available for a second operation on a field, the second operation to be performed after a first operation on the field, the first implement having a first operational width, the second implement having a second operational width different from the first operational width;
    generate a first guidance line and a second guidance line for the second operation, the first guidance line based on the first operational width and location data from a vehicle during the first operation, the second guidance line based on the second operational width and the location data;
    calculate a first crop damage metric corresponding to the first guidance line and a second crop damage metric corresponding to the second guidance line;
    select one of the first implement or the second implement based on the first crop damage metric and the second crop damage metric; and
    cause steering of the vehicle along one of the first guidance line or the second guidance line corresponding to the selected one of the first implement or the second implement.

8. The at least one non-transitory machine-readable medium of claim 7, wherein the machine-readable instructions are to cause one or more of the at least one processor circuit to determine at least one secondary metric based on at least one of the first crop damage metric or the second crop damage metric, the at least one secondary metric including at least one of an expected crop yield or an expected profit associated with at least one of the first implement or the second implement.

9. The at least one non-transitory machine-readable medium of claim 7, wherein the machine-readable instructions are to cause one or more of the at least one processor circuit to:
    calculate the first crop damage metric based on a first area of overlap between crop row locations and first tire tracks of the vehicle along the first guidance line; and
    calculate the second crop damage metric based on a second area of overlap between the crop row locations and second tire tracks of the vehicle along the second guidance line.

10. The at least one non-transitory machine-readable medium of claim 7, wherein the machine-readable instructions are to cause one or more of the at least one processor circuit to:
    select the first implement in response to determining the first crop damage metric is less than the second crop damage metric; and
    select the second implement in response to determining the second crop damage metric is less than the first crop damage metric.

11. The at least one non-transitory machine-readable medium of claim 7, wherein the field is a first field, and wherein the machine-readable instructions are to cause one or more of the at least one processor circuit to select the selected one of the first implement or the second implement for use in performing a third operation on a second field, the second field different from the first field.

12. The at least one non-transitory machine-readable medium of claim 7, wherein the machine-readable instructions are to cause one or more of the at least one processor circuit to present, via a user interface, display information corresponding to the selected one of the first implement or the second implement.

13. A method comprising:
identifying a first implement and a second implement available for a second operation on a field, the second operation to be performed after a first operation on the field, the first implement having a first operational width, the second implement having a second operational width different from the first operational width;
generating a first guidance line and a second guidance line for the second operation, the first guidance line based on the first operational width and location data from a vehicle during the first operation, the second guidance line based on the second operational width and the location data;
calculating, by at least one processor circuit programmed by at least one instruction, a first crop damage metric corresponding to the first guidance line and a second crop damage metric corresponding to the second guidance line;
selecting, by one or more of the at least one processor circuit, one of the first implement or the second implement based on the first crop damage metric and the second crop damage metric; and
causing steering of the vehicle along one of the first guidance line or the second guidance line corresponding to the selected one of the first implement or the second implement.

14. The method of claim 13, further including determining at least one secondary metric based on at least one of the first crop damage metric or the second crop damage metric, the at least one secondary metric including at least one of an expected crop yield or an expected profit associated with at least one of the first implement or the second implement.

15. The method of claim 13, further including:
calculating the first crop damage metric based on a first area of overlap between crop row locations and first tire tracks of the vehicle along the first guidance line; and
calculating the second crop damage metric based on a second area of overlap between the crop row locations and second tire tracks of the vehicle along the second guidance line.

16. The method of claim 13, further including:
selecting the first implement in response to determining the first crop damage metric is less than the second crop damage metric; and
selecting the second implement in response to determining the second crop damage metric is less than the first crop damage metric.

17. The method of claim 13, wherein the field is a first field, further including selecting the selected one of the first implement or the second implement for use in performing a third operation on a second field, the second field different from the first field.

* * * * *